US012405992B2

(12) United States Patent
Wang et al.

(10) Patent No.: US 12,405,992 B2
(45) Date of Patent: Sep. 2, 2025

(54) CONTENT POSTING METHOD AND APPARATUS, INFORMATION DISPLAY METHOD AND APPARATUS, ELECTRONIC DEVICE, AND MEDIUM

(71) Applicant: BEIJING ZITIAO NETWORK TECHNOLOGY CO., LTD., Beijing (CN)

(72) Inventors: Daoyu Wang, Beijing (CN); Ziyang Zheng, Beijing (CN); Xingyi Wang, Beijing (CN); Hui Sun, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/398,758

(22) Filed: Dec. 28, 2023

(65) Prior Publication Data
US 2024/0212064 A1 Jun. 27, 2024

Related U.S. Application Data

(63) Continuation of application No. PCT/CN2022/115678, filed on Aug. 30, 2022.

(51) Int. Cl.
*G06F 16/438* (2019.01)
*G06F 3/04845* (2022.01)
(Continued)

(52) U.S. Cl.
CPC ...... *G06F 16/4393* (2019.01); *G06F 3/04845* (2013.01); *G06F 3/04847* (2013.01);
(Continued)

(58) Field of Classification Search
CPC ............. G06F 3/04845; G06F 3/04847; G06F 16/4393; G06F 40/103; G06F 40/106
See application file for complete search history.

(56) References Cited

U.S. PATENT DOCUMENTS

2013/0332856 A1* 12/2013 Sanders ................ G06F 3/0488
715/753
2014/0280054 A1* 9/2014 Karunakaran .......... G06F 16/54
707/722
(Continued)

FOREIGN PATENT DOCUMENTS

CN 105005429 A 10/2015
CN 107085612 A 8/2017
(Continued)

OTHER PUBLICATIONS

International Search Report (with English translation) and Written Opinion issued in PCT/CN2022/115678, dated Nov. 28, 2022, 9 pages provided.

(Continued)

*Primary Examiner* — Michelle L Sams
(74) *Attorney, Agent, or Firm* — Fish & Richardson P.C.

(57) ABSTRACT

Provided are a content post method and apparatus, an information display method and apparatus, an electronic device and a medium. The method includes determining whether at least two target resources are selected, where the at least two target resources comprises at least one of an image or a video; and displaying a preset interface in response to determining that the at least two target resources are selected, where the preset interface includes a first post control and a second post control both configured to post a target content, the second post control is configured to post one second type of target content comprising the at least two target resources, and the second type of target content is a resource set formed by aggregation of the at least two target resources.

21 Claims, 14 Drawing Sheets

(51) Int. Cl.
*G06F 3/04847* (2022.01)
*G06F 40/106* (2020.01)
*G06F 40/103* (2020.01)
*G06T 3/4038* (2024.01)

(52) U.S. Cl.
CPC .......... *G06F 40/106* (2020.01); *G06F 40/103* (2020.01); *G06T 3/4038* (2013.01)

(56) References Cited

U.S. PATENT DOCUMENTS

| | | | |
|---|---|---|---|
| 2016/0062573 | A1 | 3/2016 | Dascola et al. |
| 2017/0093780 | A1 | 3/2017 | Lieb et al. |
| 2017/0160909 | A1* | 6/2017 | Barnett .................. H04N 23/63 |
| 2017/0180780 | A1 | 6/2017 | Jeffries |
| 2017/0187658 | A1 | 6/2017 | Ryu et al. |
| 2018/0324126 | A1 | 11/2018 | Grant et al. |
| 2019/0087856 | A1 | 3/2019 | Liu et al. |
| 2019/0318521 | A1* | 10/2019 | Kurosawa ............. G06F 40/166 |

FOREIGN PATENT DOCUMENTS

| | | | |
|---|---|---|---|
| CN | 108322837 | A | 7/2018 |
| CN | 110278388 | A | 9/2019 |
| CN | 111562895 | A | 8/2020 |
| CN | 112040330 | A | 12/2020 |
| CN | 112131438 | A | 12/2020 |
| CN | 112434338 | A | 3/2021 |
| CN | 112764869 | A | 5/2021 |
| CN | 112825544 | A | 5/2021 |
| CN | 113111195 | A | 7/2021 |
| CN | 113115096 | A | 7/2021 |
| JP | 2019185655 | A | 10/2019 |
| WO | WO 2009044991 | A1 | 4/2009 |

OTHER PUBLICATIONS

Office Action issued in corresponding Chinese Application No. 202111005699.7, dated Aug. 24, 2022, with English machine translation, 21 pages provided.

The production method of photo album is very simple, just add your own beautiful photos to publish photos and videos! # Tik Tok Usage Teaching # Photo Album # Tik Tok Rising Knowledge, https://www.douyin.com/video/6987217758928801056, dated Jul. 21, 2021, 12 pages.

With the atlas function, my mother no longer has to worry that I can't find the atlas # wallpaper # atlas # tutorial # basketball wallpaper, https://www.douyin.com/video/6975289423315422464, dated Jun. 19, 2021, 10 pages.

Have you learned how to add words to each atlas video Here comes the teaching # Atlas video production # Three pictures to play the whole song # Add subtitles # Tutorial, https://www.douyin.com/video/6987675059674484004, dated Jul. 22, 2021, 8 pages.

Office Action issued in Japanese Application No. 2024502043, dated Jun. 6, 2024, with machine translation.

Decision to Grant Patent in Japanese Appln. No. 2024-502043, dated Oct. 8, 2024, 5 pages (with English translation).

Examination Report No. 1 for Australian Application No. 2022338812, mailed Oct. 21, 2024, 6 pages.

* cited by examiner

CONTENT POSTING METHOD AND APPARATUS, INFORMATION DISPLAY METHOD AND APPARATUS, ELECTRONIC DEVICE, AND MEDIUM

CROSS REFERENCE TO RELATED APPLICATIONS

This is a Continuation Application of International Patent Application No. PCT/CN2022/115678, filed Aug. 30, 2022, which claims priority to Chinese Patent Application No. 202111005699.7 filed Aug. 30, 2021, the disclosures of which are incorporated herein by reference in their entireties.

TECHNICAL FIELD

Embodiments of the present disclosure relate to the field of computer technologies, for example, a content post method and apparatus, an information display method and apparatus, an electronic device and a medium.

BACKGROUND

With the development of science and technology, multiple types of applications have emerged such as social platforms and picture sharing platforms.

At present, when a user posts multiple resources, such as multiple pictures, at once in an application, the post form is relatively limited.

SUMMARY

The present disclosure provides a content post method and apparatus, an information display method and apparatus, an electronic device and a medium so that a user's controllability of resources can be improved.

In a first aspect, an embodiment of the present disclosure provides a content post method. The method includes the steps below. Whether at least two target resources are selected, where the at least two target resources are each at least one of an image or a video.

A preset interface is displayed in response to determining that the at least two target resources are selected, where the preset interface includes a second post control configured to post a target content, where the second post control is configured to post one second type of target content comprising the at least two target resources, and the second type of target content is a resource set formed by aggregation of the at least two target resources.

In a second aspect, an embodiment of the present disclosure further provides an information display method. The method includes the steps below.

A display interface is displayed, where the display interface includes a second type of target content or a first type of target content according to the embodiment of the present disclosure.

In a third aspect, an embodiment of the present disclosure further provides a content post apparatus. The apparatus includes a determination module and a display module. The determination module is configured to determine whether at least two target resources are selected, where the at least two target resources are each at least one of an image or a video. The display module is configured to display a preset interface in response to determining that the at least two target resources are selected, where the preset interface includes a second post control configured to post a target content, where the second post control is configured to post one second type of target content comprising the at least two target resources, and the second type of target content is a resource set formed by aggregation of the at least two target resources.

In a fourth aspect, an embodiment of the present disclosure provides an information display apparatus. The apparatus includes a display module. The display module is configured to display a display interface, where the display interface includes a first type of target content or a second type of target content according to the embodiment of the present disclosure.

In a fifth aspect, an embodiment of the present disclosure provides an electronic device. The electronic device includes one or more processing apparatuses, and a storage apparatus configured to store one or more programs. When executed by the one or more processing apparatuses, the one or more programs cause the one or more processing apparatuses to perform the information post method according to the embodiment of the present disclosure.

In a sixth aspect, an embodiment of the present disclosure provides a computer-readable medium storing a computer program which, when executed by a processing apparatus, causes the processing apparatus to perform the content post method according to the embodiment of the present disclosure.

DETAILED DESCRIPTION

Embodiments of the present disclosure are described in more detail hereinafter with reference to the drawings. The drawings illustrate some embodiments of the present disclosure, but it is to be understood that the present disclosure may be implemented in various manners and should not be construed as being limited to the embodiments set forth herein. On the contrary, these embodiments are provided to facilitate more thorough and complete understanding of the present disclosure. It is to be understood that the drawings and embodiments of the present disclosure are merely illustrative and are not intended to limit the scope of the present disclosure.

It is to be understood that steps described in method embodiments of the present disclosure may be performed in a different order and/or in parallel. Additionally, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Definitions of other terms are given in the description hereinafter.

It is to be noted that concepts such as "first", "second", "third", "fourth" and the like mentioned in the present disclosure are merely intended to distinguish one from another content, apparatus, module, or unit and are not intended to limit the order or interrelationship of the functions performed by the content, apparatus, module, or unit.

It is to be noted that modifications of "one" or "a plurality" mentioned in the present disclosure are intended to be illustrative and not limiting, and that those skilled in the art should understand that "one" or "a plurality" should be understood as "one or more" unless clearly expressed in the context.

The names of messages or information exchanged between apparatuses in the embodiments of the present disclosure are only used for illustrative purposes and are not intended to limit the scope of the messages or information.

Example features are provided in each of the embodiments described below: Multiple features described in the embodiments may be combined to form multiple example solutions. Each numbered embodiment should not be considered as only one solution. Additionally, if not conflicted, the embodiments herein and the features thereof may be combined with each other.

Figure 1:
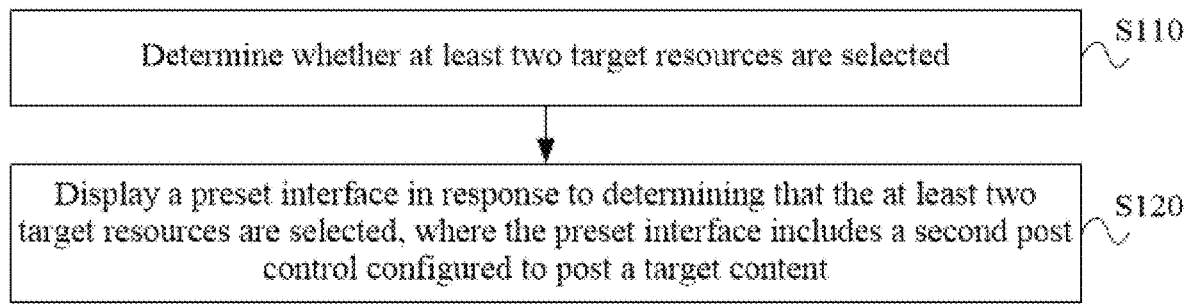
FIG. 1 is a flowchart of a content post method according to an embodiment of the present disclosure.

FIG. 1 is a flowchart of a content post method according to an embodiment of the present disclosure. The method is applicable to the case of content post. The method may be implemented by software and/or hardware and is integrated in an electronic device. The electronic device includes, but is not limited to, a mobile phone, a computer, or another device.

As shown in FIG. 1, an embodiment of the present disclosure provides a content post method. The method includes the steps below: In S110, whether at least two target resources is determined, where the selected at least two target resources comprise at least one of an image or a video.

In this embodiment, the user may be a user of the electronic device and may post information through an application on the electronic device. The at least two target resources may be to-be-posted resources. The resources are not limited in this embodiment and include, but are not limited to, images and videos.

This step does not limit the specific technical method for how to determine whether the at least two target resources are selected. Exemplarily, this step may detect the number of resources selected by the user on a resource selection interface and then determine whether the number of selected resources is greater than two. In S120, a preset interface is displayed in response to determining that the at least two target resources are selected, where the preset interface includes a second post control configured to post a target content.

The preset interface may be considered as an interface for the user to process the at least two target resources. For example, the user may edit or post the at least two target resources on the preset interface. The target content may be considered as a content displayed on a display interface after the at least two target resources are processed. The at least two target resources may be considered as resources used by a creator when the creator edits and posts information. The target content may be considered as a work that a viewing user sees after the information is posted. Behaviors such as browsing and interaction after the information is posted may be considered as consumption of the information.

One first type of target content and one second type of target content may be each considered as one independent work.

In one embodiment, the at least two target resources are each an image and/or a video, and the preset interface further includes a first post control configured to post a target content, where the first post control is configured to post each target resource of the at least two target resources as one first type of target content. The first type of target content and the second type of target content are each a resource set or a video.

The resource set may be considered as a set of images formed by aggregation of the at least two target resources. That is, the resource set is one media content work formed by aggregation of at least two images and/or videos. The video may be considered as a continuous picture formed by the at least two target resources.

In one embodiment, the resource set may be an image set.

In one embodiment, a creator client and a viewing user client may each display a display interface, and the first type of target content corresponding to the each target resource is aggregately displayed on the display interface based on a preset condition, and/or interaction information of the first type of target content corresponding to the each target resource is independently recorded.

The preset condition is not limited herein. Preset conditions include, but are not limited to, sequentially displaying corresponding first type of target contents based on an arrangement order of the at least two target resources on the preset interface, and simultaneously displaying the corresponding first type of target contents on the display interface based on the arrangement order of the at least two target resources on the preset interface.

Exemplarily, the at least two target resources selected by the user are a target resource A, a target resource B and a target resource C, and the first type of target contents corresponding to the at least two target resources are a first type of target content i, a first type of target content j and a first type of target content k, respectively. The each target resource is an image, and the first type of target content is a resource set, so when being displayed, multiple first type of target contents may be sequentially displayed on the display interface based on the arrangement order of corresponding target resources on the preset interface, or may be simultaneously displayed on the display interface based on the arrangement order of the corresponding target resources on the preset interface. It is to be understood that since each first type of target content is one independent work, the interaction information of the first type of target content corresponding to the each target source is recorded.

In the present disclosure, the first post control posts the each target resource as the one first type of target content so that multiple works can be simultaneously posted, and thereby the convenience of post the multiple works can be improved; and the second post control posts one second type of target content including multiple target resources so that one work can be posted, and thereby the user can independently select a post mode.

It is to be noted that each work has its own interaction control, that is, one first type of target content has a set of interaction control, and one second type of target content has a set of interaction control.

The interaction information of the each first type of target content is independently counted. The interaction information may be considered as information or association information triggered by the user operating the interaction control of the first type of target content. Interaction controls are not limited herein and include, but are not limited to, giving a like, being forwarded, being collected, coproducing, replying and commenting.

In the content post method according to the embodiment of the present disclosure, the case where the current user's controllability of resources is poor can be avoided: the preset interface includes the first post control and the second post control so that the target contents corresponding to the at least two target resources can be posted in different forms; and the user can choose to post the multiple target resources as the multiple first type of target contents, for example, the each target resource can be independently posted as one target content, or the user can choose to post the one second type of target content including the multiple target resources, so that the user's controllability of the multiple target resources can be improved.

On the basis of the preceding embodiment, variant embodiments of the preceding embodiment are proposed. It is to be noted that herein, for the brevity of description, only differences from the preceding embodiment will be described in the variant embodiments.

In one embodiment, when the creator performs editing, the at least two target resources are displayed in a third set position on the preset interface in a third set form, or one target resource of the at least two target resources is displayed in a fourth set position on the preset interface in a fourth set form.

The multiple target resources may be simultaneously displayed in the third set position on the preset interface in the third set form or may be sequentially displayed in the fourth set position on the preset interface in the fourth set form.

The specific content of the third set form is not limited in this embodiment as long as the each target resource can be uniquely identified, for example, the third form is a thumbnail or a heatmap of the each target resource. The specific content of the fourth set form is also not limited in this embodiment as long as the one target resource of the multiple target resources can be represented, for example, the fourth set form is to display the positional relationship (such as a display order) between the current target resource, that is, the target resource currently displayed on the preset interface, and the multiple target resources on the preset interface.

In one embodiment, the third set form includes displaying thumbnails of the at least two target resources, and the fourth set form includes displaying the display order of the current target resource in the at least two target resources.

The display order may be understood as an order of the current target resource among the multiple target resources when the current target resource is displayed on the preset interface.

Figure 2:
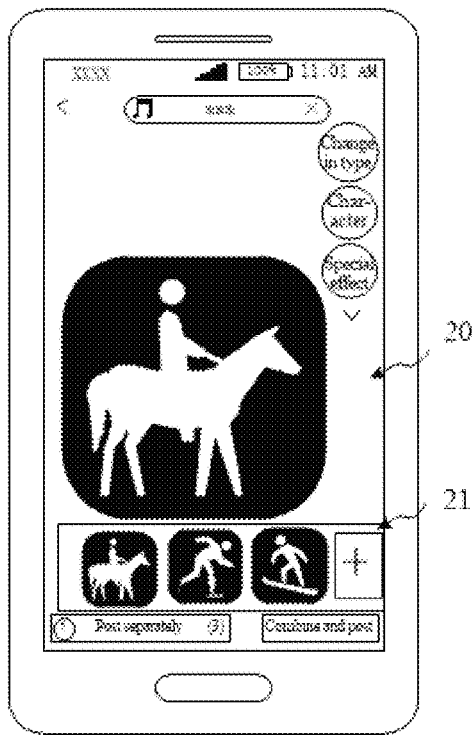
FIG. 2 is a diagram illustrating an interface of a display mode of a target resource according to an embodiment of the present disclosure.

FIG. 2 is a diagram illustrating an interface of a display mode of a target resource according to an embodiment of the present disclosure. As shown in FIG. 2, the multiple target resources may be displayed in the third set position 21 on the preset interface 20 in the third set form. The third set form shown in FIG. 2 is the form of thumbnails. The user may select a "post separately" control to post the first type of target content or select a "combine and post" control to post the second type of target content. Characters displayed by the control on the preset interface 20 are not limited herein. Exemplarily; the "combine and post" control may be replaced with a "next" control, and after the "next" control is selected, the second type of target content is posted.

Figure 3:
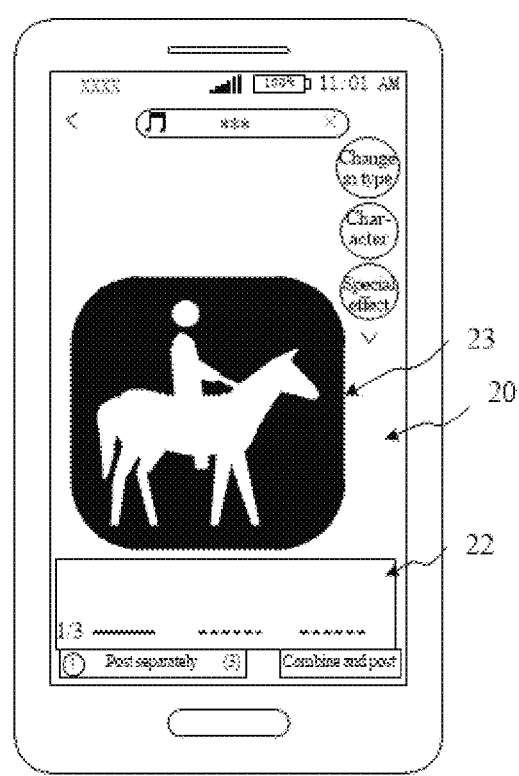
FIG. 3 is a diagram illustrating an interface of another display mode of a target resource according to an embodiment of the present disclosure.

FIG. 3 is a diagram illustrating an interface of another display mode of a target resource according to an embodiment of the present disclosure. As shown in FIG. 3, the current target resource 23 may be displayed in the fourth set position 22 on the preset interface 20 in the fourth set form. The fourth set form shown in FIG. 3 may be the display order of the current target resource 23 among the multiple target resources. 1/3 and a progress bar shown in FIG. 3 represent that the display order of the current target resource 23 among the multiple target resources is the first. Additionally, the progress bar may also illustrate the progress displayed by the current target resource 23. The multiple target resources may be automatically played on the preset interface, and the playing duration may be represented by the progress bar.

Figure 4:
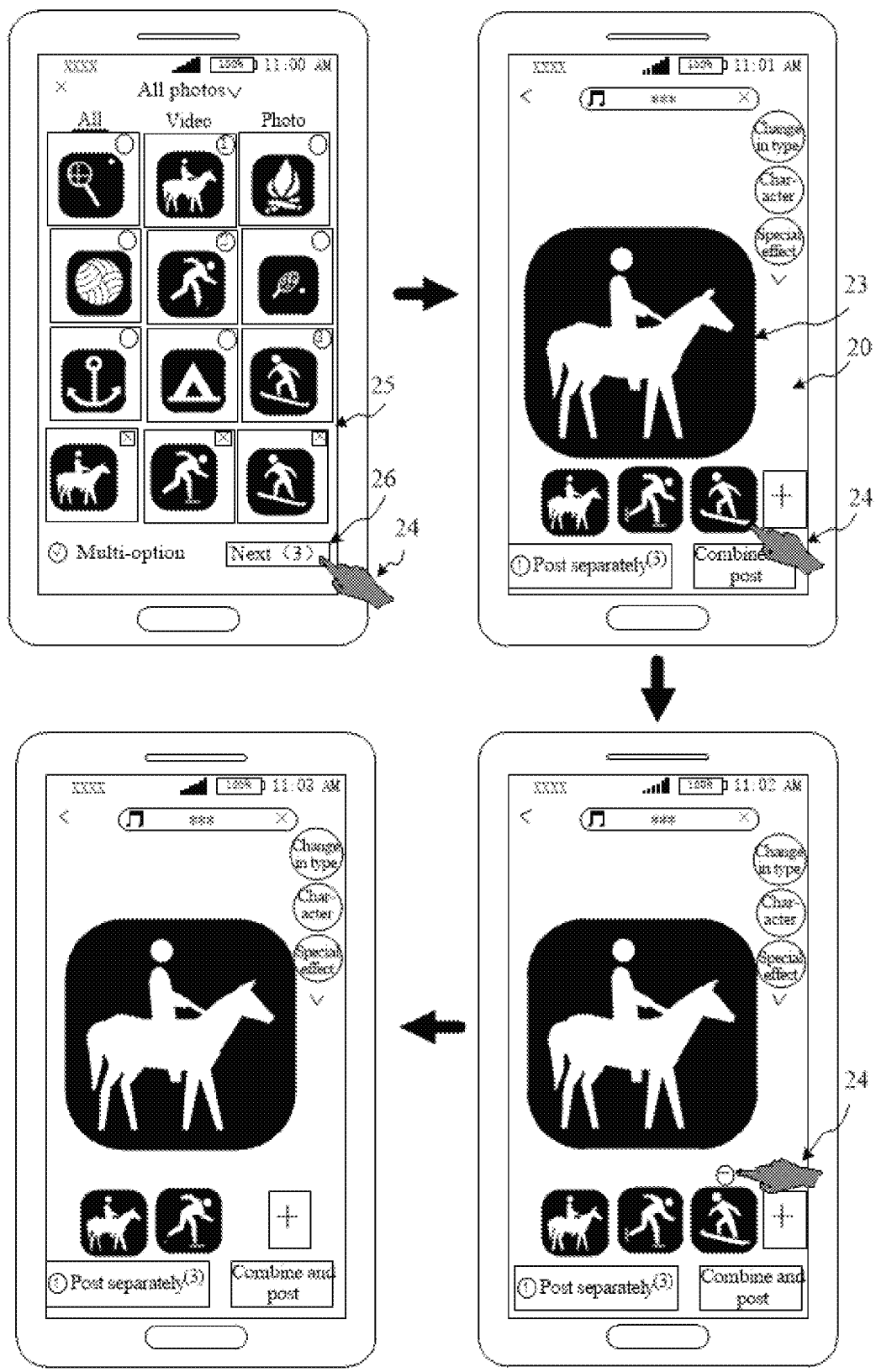
FIG. 4 is an interaction diagram editing a target resource in a third set form according to an embodiment of the present disclosure.

FIG. 4 is an interaction diagram editing a target resource in a third set form according to an embodiment of the present disclosure. Referring to FIG. 4, after the user 24 selects three target resources on the resource selection interface 25, a done control 26 is operated to display the preset interface 20, and the current target resource 23 is displayed in the display position, and all the target resources are displayed in the third set position in the form of thumbnails. The user 24 may edit the target resources by operating the target resources displayed in the third set form, that is, the target resources displayed in thumbnails shown in FIG. 4. The editing that can be completed by operating the target resources displayed in the third set form includes, but is not limited to, deletion or move. Referring to FIG. 4, after the user 24 operates one target resource displayed in the form of a thumbnail, a deletion control is displayed. After the user 24 operates the deletion control, the operated target resource is deleted from the preset interface. The operation form of the target resources displayed in thumbnails is not limited herein, such as a double click or a click, as long as it can be distinguished from a set operation. The set operation includes, but is not limited to, a click or a double click.

Figure 5:
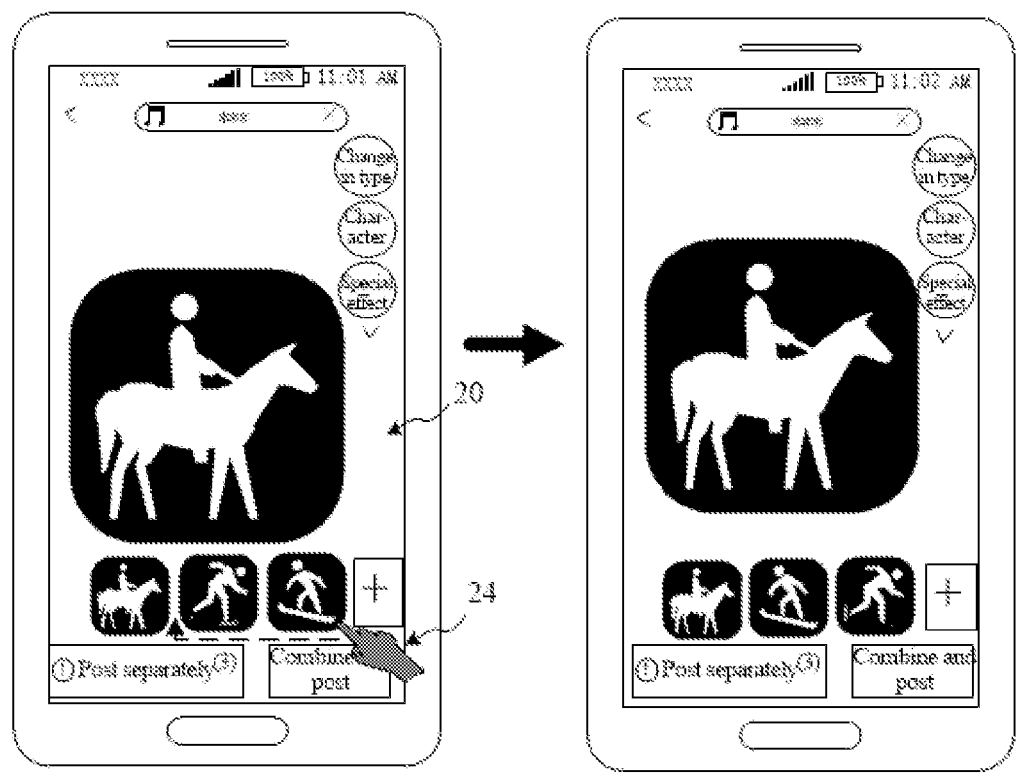
FIG. 5 is another interaction diagram editing a target resource in a third set form according to an embodiment of the present disclosure.

FIG. 5 is another interaction diagram illustrating editing a target resource in a third set form according to an embodiment of the present disclosure. Referring to FIG. 5, after the user 24 operates the target resources displayed in the third set position on the preset interface 20 in the third set form according to the trajectory of a dotted arrow shown in FIG. 5, the target resources are moved. The operation trajectory is not limited herein. The operation to trigger and move the target resources is not limited herein. Exemplarily, the user 24 may long press the target resources to be moved to trigger the movement of the target resources, and after being triggered, the target resources to be moved may be moved.

Figure 6A:
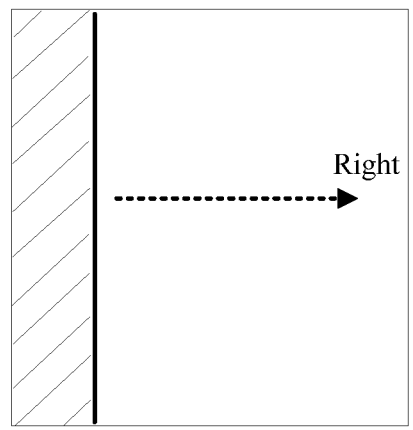
FIG. 6A is a diagram illustrating a target resource display progress according to an embodiment of the present disclosure.

FIG. 6A is a diagram illustrating a target resource display progress according to an embodiment of the present disclosure. It is to be noted that when being displayed on the preset interface, the multiple target resources may be cyclically played. When the multiple target resources are played for display, the playing progress of the currently played target resource may be displayed on the preset interface. As shown in FIG. 6A, using that the target resources are displayed in the form of thumbnails as an example, the playing progress of the currently played target resource may be displayed on a thumbnail corresponding to the currently played target resource. Display forms are not limited to forms of numbers and progress bars. FIG. 6A uses the form of a progress bar as an example. In FIG. 6A, a box may represent the thumbnail of the currently played target resource, and a vertical line may represent the progress bar. When the progress bar moves to the rightmost end of the thumbnail along the direction of the dotted arrow; it may be considered that the currently played target resource finishes being played. A shaded portion on the thumbnail represents the played progress of the target resource.

Figure 6B:
FIG. 6B is a diagram illustrating another target resource display progress according to an embodiment of the present disclosure.

FIG. 6B is a diagram illustrating another target resource display progress according to an embodiment of the present disclosure. As shown in FIG. 3, the fourth set position represents a target resource in the form of a progress bar. As shown in FIG. 6B, in the present disclosure, the playing progress of the target resource may be represented by changing the style of the progress bar. In the figure, a solid portion represents the played progress of the target resource while a dotted portion represents the unplayed progress of the target resource. The style is not limited herein, for example, the played progress and unplayed progress of the target resource may be represented by lines having different line types, different thicknesses and different depths.

It is to be noted that the related technical method for the display progress of the target resource according to the present disclosure is also applicable to the solution for displaying the progress when the first type of target content is displayed on the display interface.

In one embodiment, after the preset interface is displayed, the method further includes the steps below.

After a set operation is received, a target resource corresponding to the set operation is displayed.

The action position and operation content of the set operation are not limited herein. Multiple technical methods for switching the target resources may be provided on the preset interface as long as the target resource corresponding to the set operation can be displayed after the set operation is received.

Exemplarily, the set operation may be a click operation applied to the target resources displayed in the third set position in the third set form. After the set operation is received, the applied target resources may be displayed in the display position on the preset interface. The display position is not limited herein. The third set position and the fourth set position may have overlapping positions and may also be included in the display position. The portion of the overlapping positions may guarantee the visibility of the content displayed in each position by configuring the transparency of the content displayed.

Exemplarily, the set operation may also be an operation of sliding left and right applied to the display position, and after the set position is received, the target resource corresponding to the set operation is displayed on the preset interface.

Exemplarily, the set operation may also be a click operation applied to the progress bar in the fourth set position, and in response to the set operation, the target resource corresponding to the set operation is displayed on the preset interface.

In one embodiment, after the target resource corresponding to the set operation is displayed, the method further includes the steps below.

In response to determining that an edit operation for the currently displayed target resource is received, the currently displayed target resource is edited based on the edit operation; and in response to determining that the edit operation for the currently displayed target resource is not received, the multiple target resources are cyclically played starting from the currently displayed target resource.

When the edit is completed, and the multiple target resources continue to be cyclically played, the remaining duration of the target resource that is being edited, that is, the currently displayed target resource, may be first played, and then the multiple target resources are cyclically played starting from the target resource that is being edited.

Exemplarily, five target resources are provided in total, and when the third target resource is played, that is, the current displayed target resource starts to be edited, after the edit is completed, the third target resource continues to be first played, and then the subsequent target resources are cyclically played. For example, the fourth target resource and the fifth target resource are played.

The multiple target resources may be scrolled for playing. Expect for scrolling for playing, the user may also switch to the target resources to be displayed by sliding or operating the target resources displayed in the third set form.

When the target resources are edited, editing of an effective object may be determined based on the edited content. The correspondence relationship between the edited content and the effective object is not limited herein, may be determined based on whether the edited content can be applied to target resources other than the currently edited target resource, or may also be determined based on indication information of the effective object input by the user.

Exemplarily, when an audio resource of the current target resource, such as music, is selected, the selected audio resource may be directly applied to all the target resources, may also be applied to all the target resources after the user operates and represents the application of all the controls, or may also be applied to the target resources specified by the user, and the user may select a used object through an applicable object selection control. For example, the target resource A, the target resource B and the target resource C are currently included, and after the audio resource of the target resource A is selected, the applicable object selection control on the preset interface may be used for selecting an object to which the audio resource may also be applicable. If the target resource C is selected, the audio resource is associated with the target resource C. The applicable object selection control may be considered as a control for selecting an object used for the current edit operation.

In response to determining that the edit operation for the displayed target resource is not received, the multiple target resources may be cyclically played starting from the displayed target resource.

After the edit operation for the displayed target resource is completed, the multiple target resources may be cyclically played starting from the displayed target resource.

The playing duration of the each target resource is not limited herein, may be determined based on an actual scenario, for example, based on the number of selected target resources, or may be a constant duration.

When the multiple target resources are cyclically played, in the present disclosure, whether there is a set operation may also be monitored, and after the set operation is received, the target resource corresponding to the set operation is displayed.

Figure 7:
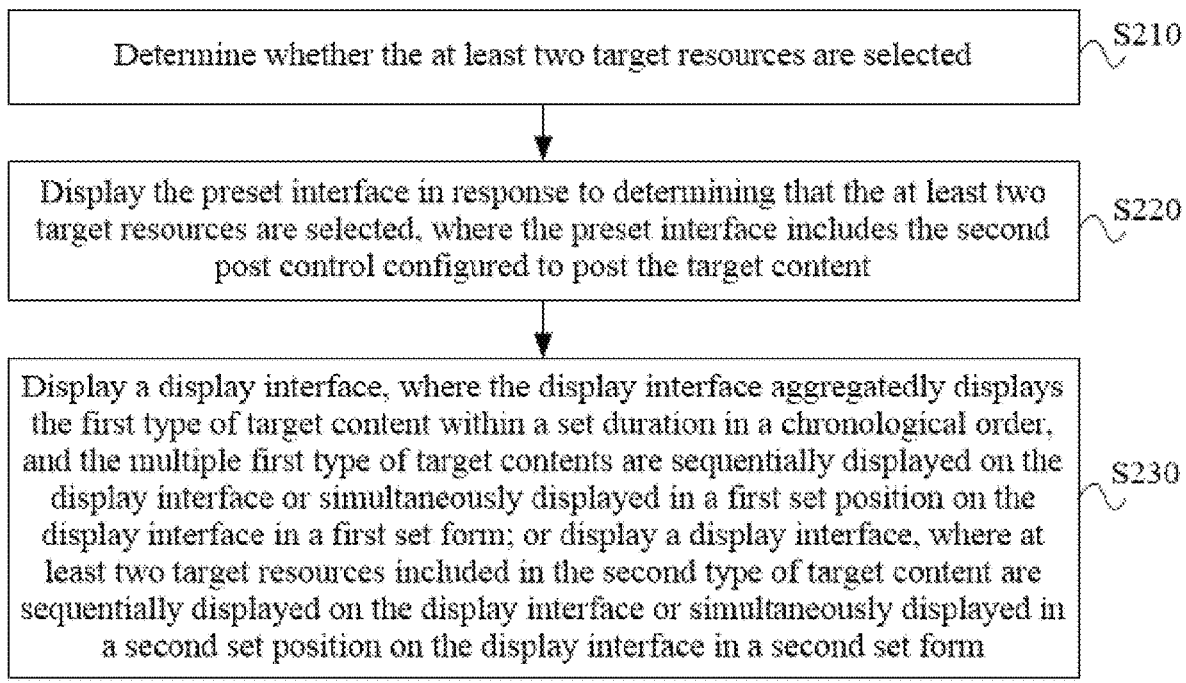
FIG. 7 is a flowchart of a content post method according to another embodiment of the present disclosure.

FIG. 7 is a flowchart of a content post method according to another embodiment of the present disclosure. This embodiment is embodied based on the preceding embodiment and includes that the display interface aggregately displays the first type of target content within a set duration in a chronological order, and the multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

It is to be understood that for a creator user, the display interface may be a preview interface when a work is edited or a playing interface when a work is posted. For the viewing user, the display interface is a playing interface of a work. For details not described in this embodiment, reference can be made to the preceding embodiments, and details are not described herein. As shown in FIG. 7, the content post method according to the embodiment of the present disclosure includes the steps below:

In S210, whether the at least two target resources is selected, where the selected at least two target resources are each the at least one of the image or the video.

In S220, the preset interface is displayed in response to determining that the at least two target resources are selected, where the preset interface includes the second post control configured to post the target content.

In S230, a display interface is displayed, where the display interface aggregately displays the first type of target content within a set duration in a chronological order, and the multiple first type of target contents are sequentially displayed on the display interface or simultaneously displayed in a first set position on the display interface in a first set form: or a display interface is displayed, where at least two target resources included in the second type of target content are sequentially displayed on the display interface or simultaneously displayed in a second set position on the display interface in a second set form.

In one embodiment, after the user operates the first post control, the each target resource is posted as the one first type of target content, the multiple first type of target contents are aggregately displayed in the chronological order, and the each first type of target content is displayed for a preset duration. The preset duration is not limited herein and may be determined based on an actual scenario, for example, based on the number of selected target resources. The each first type of target content is displayed on the display interface for the set duration in the chronological order. The display order of the each first type of target content may be determined based on an arrangement order on the preset interface.

The display interface may display the first type of target contents posted within the set duration. The first type of target contents within the set duration may be simultaneously posted through the first post control or may also be posted by operating the first post control at different times within the set duration.

Exemplarily, the user first posts a first type of target content m and a first type of target content n through the first post control and then posts a first type of target content y and a first type of target content z through the first post control within the set duration (such as within the same day), so the first type of target content m, the first type of target content n, the first type of target content y and the first type of target content z may be aggregately displayed on the display interface. For example, the first type of target contents are sequentially displayed on the display interface, the playing order of the currently displayed first type of target content is displayed using a multi-segment progress bar, and the number of multi-segment progress bars may be determined based on the number of target resources included in the currently displayed first type of target content.

The first type of target content m and the first type of target content n may share the first audio resource while the first type of target content y and the first type of target content z may share the second audio resource. That is, the first type of target contents posted respectively can share the audio resource while the first type of target contents posted at different times cannot share the audio resource.

In one embodiment, the target contents within the set duration may be each displayed on the display interface.

Exemplarily, the user first posts the first type of target content m and the first type of target content n through the first post control and posts a second type of target content h through the second post control within the set duration, so the first type of target content m, the first type of target content n and the second type of target content h may be simultaneously displayed on the display interface in the form of aggregation. The first type of target content m and the first type of target content n may share the third audio resource while the second type of target content h may use the independent fourth audio resource.

In one embodiment, after the user operates the first post control, the multiple first type of target contents may be simultaneously displayed in the first set position on the display interface in the first set form. The specific form of the first set form is not limited as long as the multiple first type of target contents can be simultaneously displayed. The each first type of target content corresponds to its own interaction control.

In one embodiment, after the user operates the second post control, the at least two target resources are sequentially displayed on the display interface or simultaneously displayed in the second set position on the display interface in the second set form.

The specific positions of the first set position and the second set position are not limited in this embodiment and may be set as required by business. The specific form of the second set form is not limited as long as the multiple target resources can be simultaneously displayed.

Figure 8:
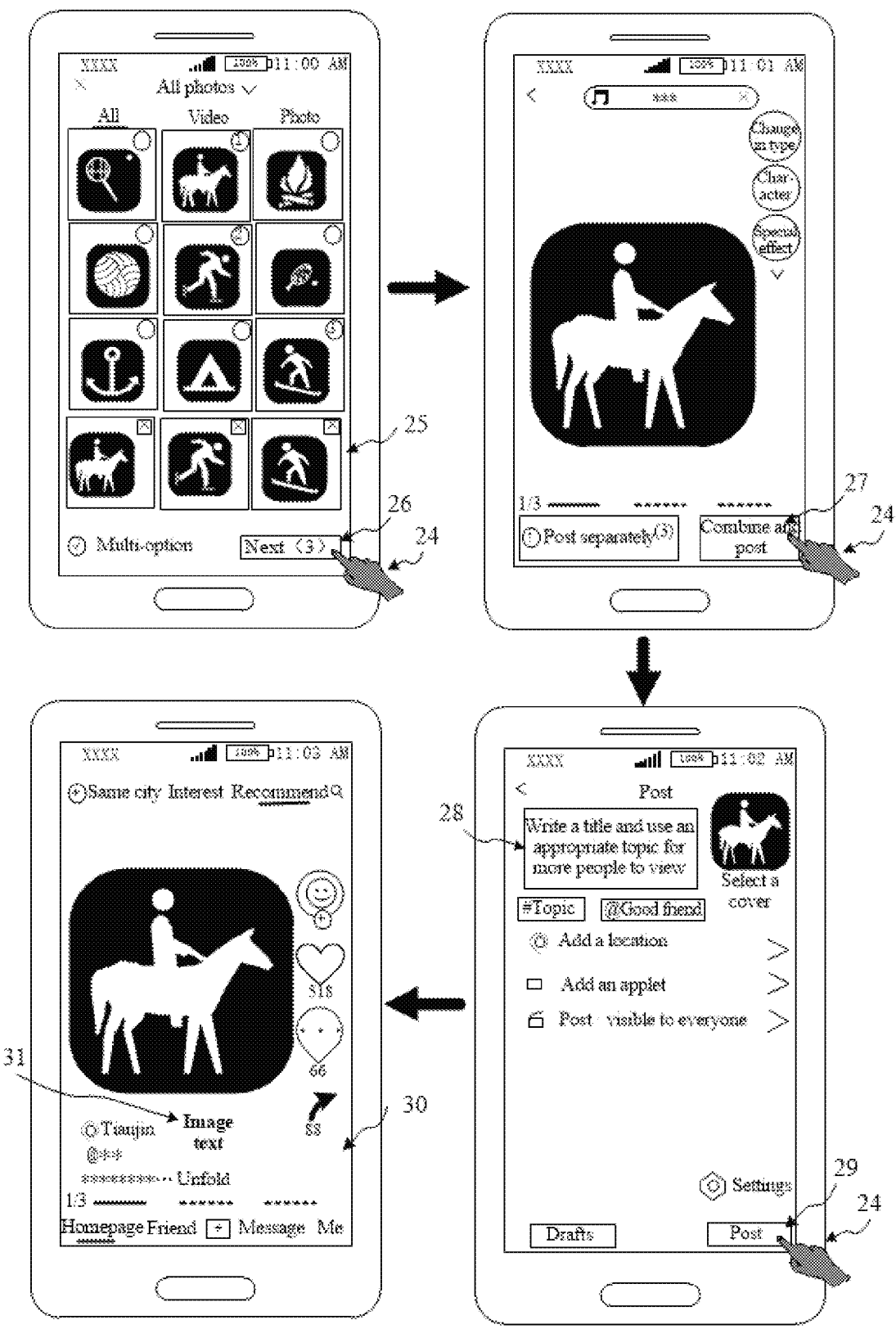
FIG. 8 is an interaction diagram illustrating a content post method according to another embodiment of the present disclosure.

FIG. 8 is an interaction diagram illustrating a content post method according to another embodiment of the present disclosure. Referring to FIG. 8, after the user 24 selects three target resources on the resource selection interface 25, the done control 26 is operated. The specific form of the done control 26 is not limited herein. After the done control 26 is operated, the preset interface is displayed and includes the second post control 27. After the user 24 operates the second post control 27, a post interface is displayed, and the user 24 may set the information of the second type of target content on the post interface. The set content includes, but is not limited to, text description information. The electronic device may acquire the text description information input into a text description region 28 by the user 24 on the post interface. The text description region may acquire the text description information of any length. After the user 24 operates a done control 29, the second type of target content is posted. After the done control 29 is operated, the display interface 30 is displayed. The display interface 30 shown in FIG. 8 sequentially displays the at least two target resources included in the second type of target content. The second type of target content is used as one work for interaction operation statistics. The display interface 30 may also display identification information 31 of the second type of target content to represent the post form of the second type of target content. For example, a control representing an image text identifies that the second type of target content is posted as one work in the form of an image text.

It is to be noted that the specific content of the operation is not limited in the present disclosure as long as the corresponding content can be triggered.

Figure 9:
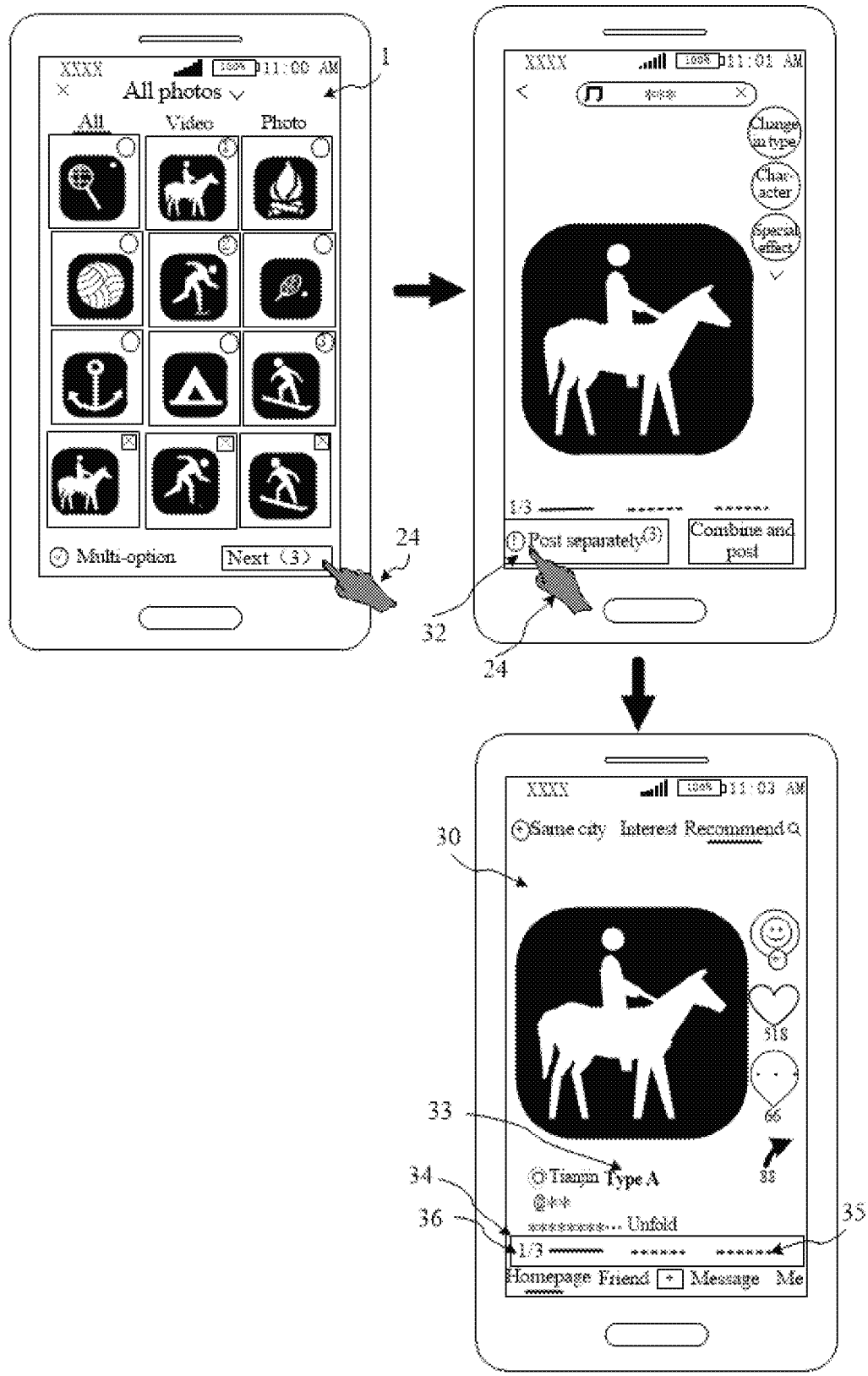
FIG. 9 is another interaction diagram illustrating a content post method according to another embodiment of the present disclosure.

FIG. 9 is another interaction diagram illustrating a content post method according to another embodiment of the present disclosure. Referring to FIG. 9, after the user 24 operates the first post control 32, the multiple first type of target contents are posted. The display interface 30 may also display identification information 33 of the first type of target content to represent the post form of the first type of target content. For example, a preset control used as identification information 33 of the first type of target content identifies that the multiple first type of target contents are posted as multiple works. Exemplarily; the preset control may be a "type A" control and represent that the multiple target resources are posted respectively as the multiple first type of target contents (that is, contents of multiple types A). The number of the target resources may be the same as the number of the first type of target contents.

Figure 10:
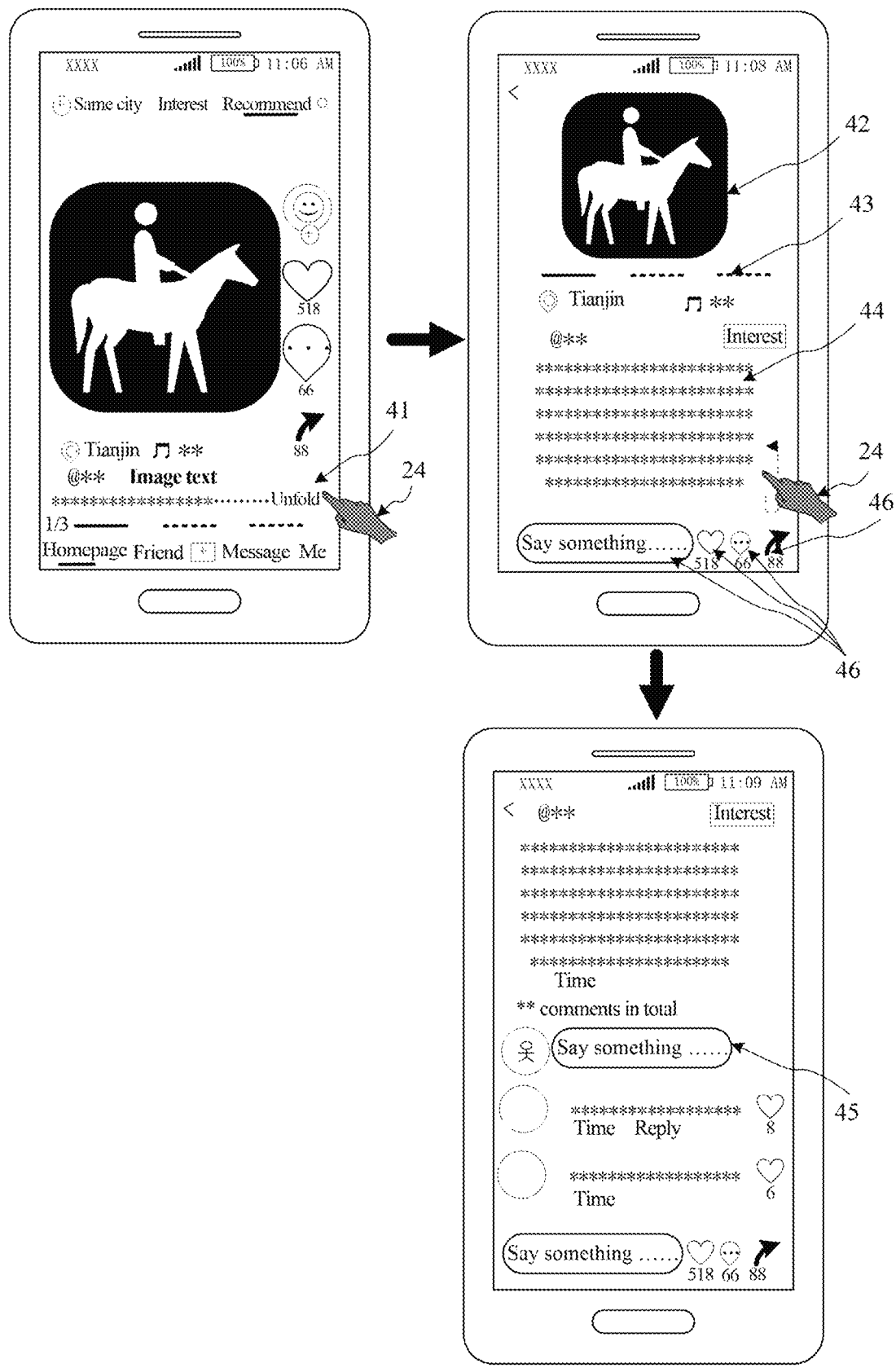
FIG. 10 is a diagram illustrating an interface of a second type of target content according to another embodiment of the present disclosure.

FIG. 10 is a diagram illustrating an interface of a second type of target content according to another embodiment of the present disclosure. Referring to FIG. 10, the display interface may display the second type of target content and the corresponding text description information. After character description information or an unfolding control 41 is operated, a detail interface may display the complete text description information. The detail interface may be displayed on the top of the display interface in the form of a panel, for example, overlain on the top of the display interface, or may also be a retriggered interface, for example, an image region on the original display interface is moved up, and the complete text description information is displayed below the image region.

When the detail interface displays the target resources, and the first displayed target resource among the target resources sequentially displayed by the user slides to the first set direction, the detail interface is exited. When the last target resource among the target resources sequentially displayed slides to the second set direction, the user enters the profile interface. The first set direction may be to the right while the second set direction may be to the left. The first set direction and the second set direction are not limited herein.

When being the retriggered interface, the detail interface may display the second type of target content 42, a corresponding identifier 43, the complete text description information 44, comment information 45 and an interaction control 46. The positions of the second type of target content 42, the corresponding identifier 43, the text description information 44, the comment information 45 and the interaction control 46 are not limited. For example, the second type of target content 42, the corresponding identifier 43, the text description information 44, the comment information 45 and the interaction control 46 may be sequentially displayed from top to bottom on the detail interface. It is to be understood that the interaction control 46 on the detail interface may be an interaction control existing on the display interface 30, and after the detail interface is triggered, the interaction control is transferred to the detail interface for display.

When the detail interface is displayed on the top of the display interface in the form of a panel, the text description information 44 and the comment information 45 may be displayed on one interface or may also be sequentially displayed on the detail interface through sliding operations.

Figure 11:
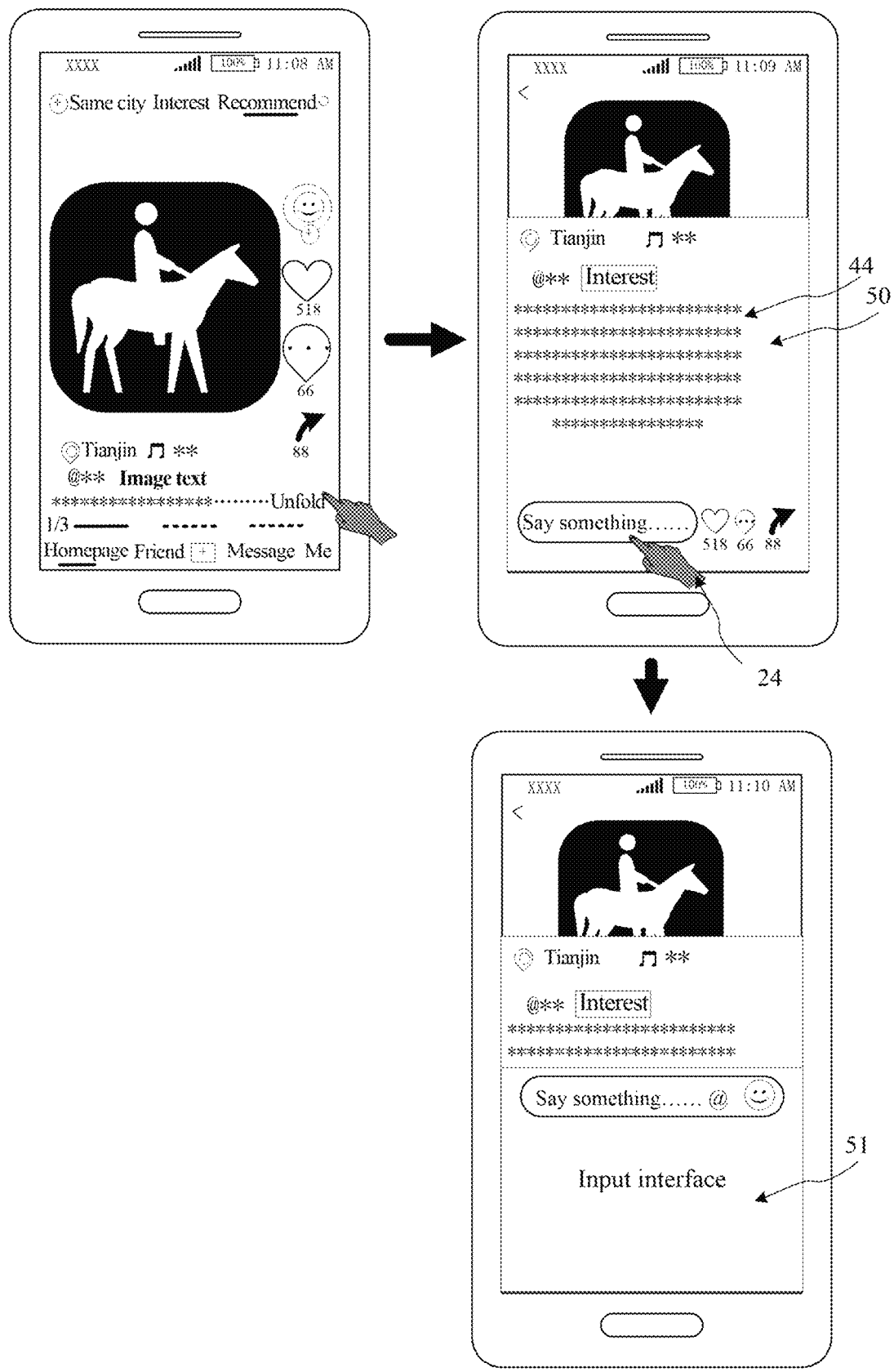
FIG. 11 is a diagram illustrating another interface of a second type of target content according to another embodiment of the present disclosure.

FIG. 11 is a diagram illustrating another interface of a second type of target content according to another embodiment of the present disclosure. Referring to FIG. 11, the detail interface currently displays only the text description information 44. The detail interface may further include a sliding control 50 to faster slide the corresponding content, such as the corresponding text description information 44, by operating the sliding control 50. After the user 24 operates an edit control, an input interface 51 may be triggered for display to complete the input of comment content.

Figure 12:
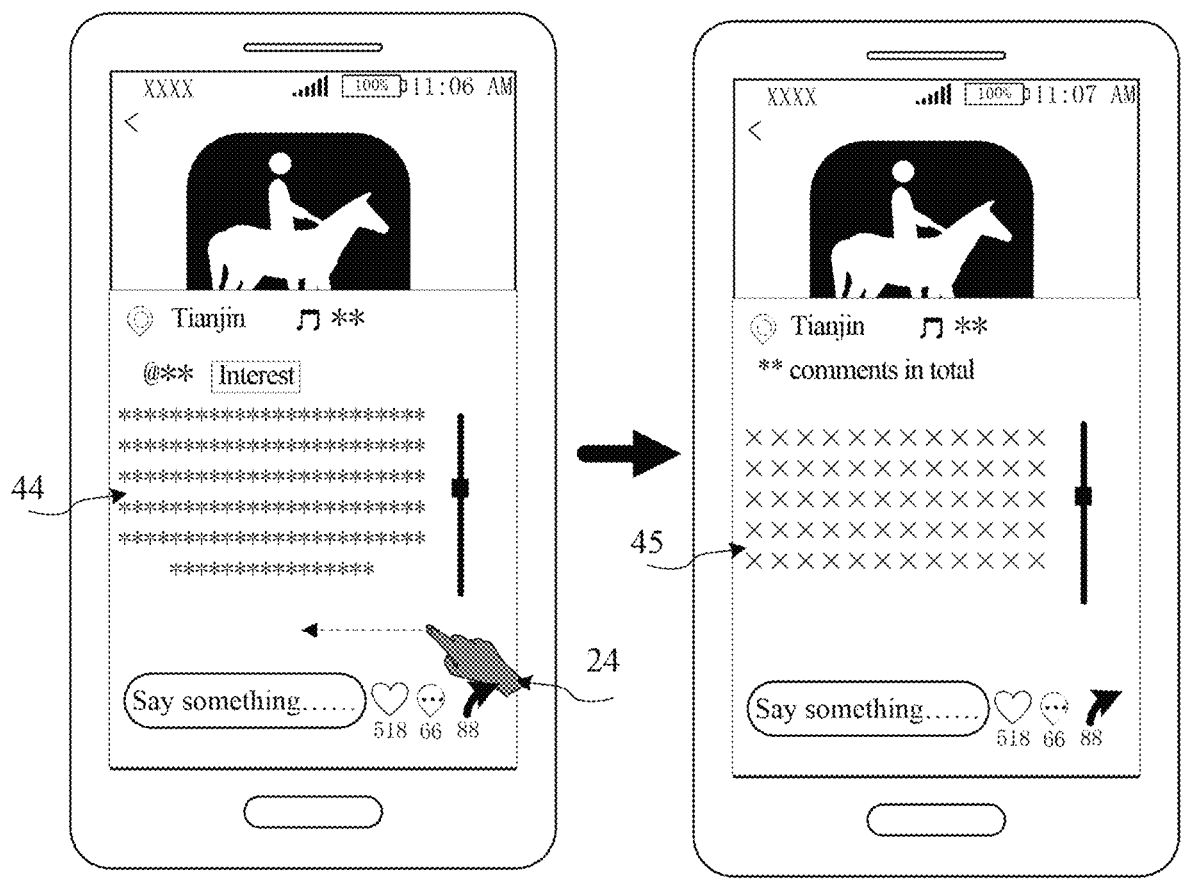
FIG. 12 is a diagram illustrating a detail interface according to another embodiment of the present disclosure.

FIG. 12 is a diagram illustrating a detail interface according to another embodiment of the present disclosure. As shown in FIG. 12, after the user 24 operates the position of the text description information 44 in the direction of a dotted arrow; the comment information 45 may be switched for display: The operation of switching and displaying the comment information 45 and the text description information 44 is not limited in the present disclosure.

Figure 13:
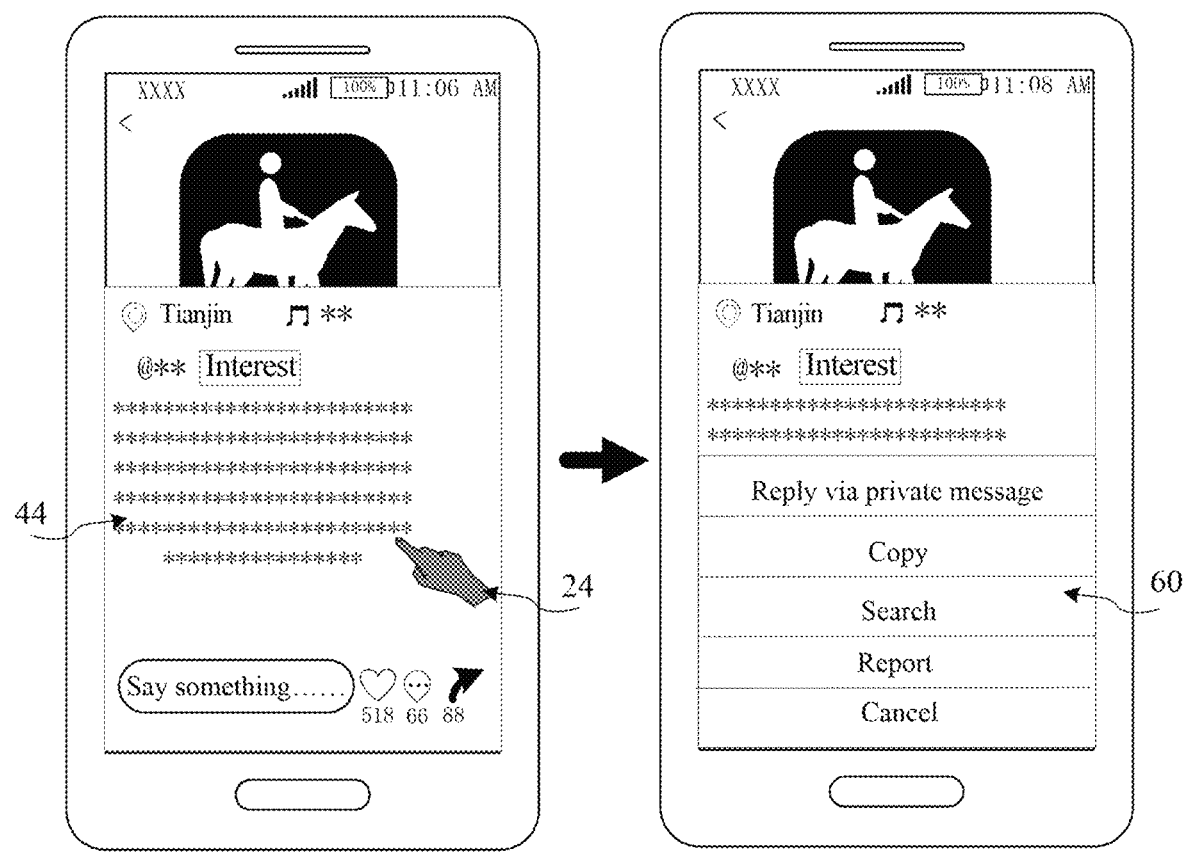
FIG. 13 is an interaction diagram illustrating a detail interface according to another embodiment of the present disclosure.

FIG. 13 is an interaction diagram illustrating a detail interface according to another embodiment of the present disclosure. As shown in FIG. 13, after the user 24 operates the text description information 44, an interaction control 60 corresponding to the text description information 44 may be triggered for display.

Figure 14:
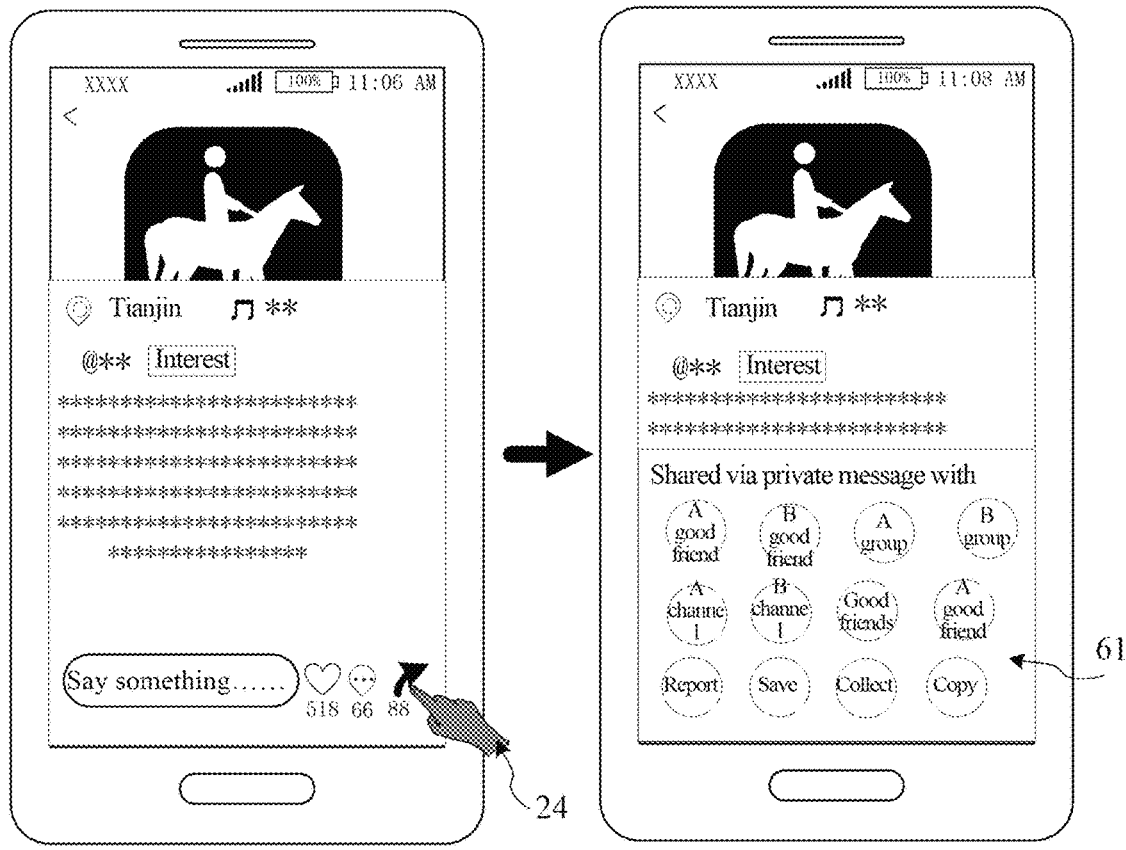
FIG. 14 is an interaction diagram illustrating a detail interface according to another embodiment of the present disclosure.

FIG. 14 is an interaction diagram illustrating a detail interface according to another embodiment of the present disclosure. As shown in FIG. 14, after the user 24 operates a sharing control for the second type of target content, a corresponding interaction control 61 may be triggered.

In the content post method according to this embodiment of the present disclosure, after the first post control or the second post control on the preset interface is operated, the display interface is triggered and may implement one work, that is, the display of the one second type of target content, or may also implement multiple works, that is, the display of the multiple first type of target contents, so that the selectability of information post can be enhanced, and the original operation experience can be provided for the user. Additionally, in the present disclosure, the multiple works can be directly posted by the first post control, and thereby the convenience of post the multiple works can be enhanced.

On the basis of the preceding embodiment, variant embodiments of the preceding embodiment are proposed. It is to be noted that herein, for the brevity of description, only differences from the preceding embodiment will be described in the variant embodiments.

In one embodiment, that the multiple first type of target contents are sequentially displayed on the display interface includes the steps below.

The display interface cyclically or sequentially plays the multiple first type of target contents, and/or after a first preset operation from the user is received, a first type of target content corresponding to the first preset operation is displayed, and the multiple first type of target contents are cyclically played starting from the current first type of target content.

The first preset operation may be an operation for switching the first type of target contents. The specific operation of the first preset operation is not limited herein. Exemplarily, the first preset operation may be to slide left and right or select an identifier of the each first type of target content in the region in which the currently displayed first type of target content is located to switch the first type of target contents.

The display interface may cyclically or sequentially play the multiple first type of target contents and display the currently played first type of target content. The identifier corresponding to the each first type of target content may be displayed in a set position on the display interface. FIG. 9 illustrates the identifier 35 in the set position 34. Here, the identifier 35 being the progress bar is used as an example. The specific content of the identifier 35 is not limited in the present disclosure. The identifier 35 may identify the currently displayed first type of target content. The identifier 35 of the currently displayed first type of target content may be distinguished from the identifiers 35 of the undisplayed first type of target contents. For example, a display is distinguished from another one by different colors or different line types. The display interface 30 may display the identifiers 35 of all the first type of target contents. The identifier 35 of the currently displayed first type of target content may also represent the display progress.

The display interface 30 may also display the display order 36 of the currently displayed first type of target content. The form and position of the display order are not limited herein.

It is to be noted that the specific positions and forms of all the controls and contents of the present disclosure are not limited.

In one embodiment, the multiple first type of target contents correspond to the same one audio resource, and when the multiple first type of target contents are played cyclically or sequentially, or are switched upon receiving the first preset operation, the audio resource continues to be played. Continuous playing refers to that the audio resource does not hop, and that words and music continue to be played.

In the present disclosure, the each first type of target content may be considered as an independent work, and the multiple first type of target contents correspond to the same one audio resource.

When the multiple first type of target contents are played by the user in a sequential order, in a reverse order, or clicking the progress bar to hop, the audio resource continues to be played without interruption.

After the user switches from the display interface displaying the simultaneously posted multiple first type of target contents to the display interface displaying the remaining contents, the audio resource starts to be played again from the beginning in response to determining to switch back to the display interface displaying the multiple first type of target contents. The remaining contents refer to works displayed in the application other than the multiple of first type of target contents, for example, multiple first type of target contents simultaneously posted at another time within the set duration.

Exemplarily, the multiple first type of target contents simultaneously posted on the display interface include a first type of display content a, a first type of display content b and a first type of display content c, and when the first type of display content b is displayed, the user switches to other works other than the first type of display content a, a first type of display content b and a first type of display content c by operations such as sliding and then switches back to multiple works corresponding to the first type of display content a, the first type of display content b and the first type of display content c. Therefore, the first type of display content b may continue to be displayed, where the audio resource starts to be played again from the beginning.

After the currently displayed first type of target content is paused, in response to determining that the first preset operation is received to switch the first type of target contents, the audio resource continues to be played.

In one embodiment, the multiple first type of target contents share the audio resource, and among m first type of target contents, each first type of target content is played for n seconds. When the multiple first type of target contents are automatically played, in response to determining that the audio resource is less than m*n, music is cyclically played; and in response to determining that the audio resource is greater than or equal to m*n, after the each first type of target content is played for n seconds, the audio resource stops to be played.

In response to determining that the multiple first type of target contents are cyclically played, or are repeatedly switched under the first preset operation, the audio resource continues to be played, and after the audio resource finishes being played, the audio resource is cyclically played from the beginning.

In response to determining that the multiple first type of target contents do not correspond to any audio resource, the each first type of target content is played for a set duration. The set duration is not limited.

When the current version of the application does not support the multiple first type of target contents to cyclically play the audio resource, the audio resource is filtered, and the multiple first type of target contents are directly played.

In one embodiment, when one first type of target content is shared with a platform on which the application is located or other platforms, or is collected in the application, the operated first type of target content is decoupled from the remaining first type of target contents simultaneously posted, and the first type of target content uses the complete audio resource.

The other platforms may be considered as platforms other than the platform on which the application running the information method according to the present disclosure is located.

In one embodiment, when one first type of target content is shared with a platform on which the application is located or other platforms, or is collected in the application, the playing duration of the first type of target content is equal to the playing duration of the audio resource (the maximum playing duration of the audio resource may be set according to a scene, such as 30 s) or is a default duration, such as 5 s.

In one embodiment, when the first type of target content is shared with other users in the application, such as shared with friends in the form of private messages, all the simultaneously posted first type of target contents are shared, so is the corresponding audio resource.

The other users may be considered as users other than the operator user.

In one embodiment, when one first type of target content is downloaded, a target resource corresponding to the first type of target content is downloaded. For example, a picture corresponding to the first type of target content is downloaded.

In one embodiment, when all the simultaneously posted first type of target contents are shared, and the multiple first type of target contents are sequentially displayed on the display interface, the method further includes the steps below.

After the sharing control on the display interface is triggered, when the shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

When the first type of target content is displayed, the audio resource continues to be played.

In one embodiment, when the first type of target content is decoupled from the remaining simultaneously posted first type of target contents when being shared, and the multiple first type of target contents are sequentially displayed on the display interface, the method further includes the steps below:

After the sharing control on the display interface is triggered, only the shared first type of target content is displayed when being displayed.

In one embodiment, that the at least two target resources included in the second type of target content are sequentially displayed on the display interface includes the steps below.

The display interface cyclically or sequentially plays multiple target sources, and/or after a second preset operation from the user is received, a target resource corresponding to the second preset operation is displayed, and the multiple target resources are cyclically played starting from the current target resource.

The operation mode of the second preset operation may be to slide left and right or select an identifier of the each target resource in the region in which the currently displayed target resource is located to switch the multiple target resources. The second preset operation and the first preset operation may have the same operation mode or different operation modes. The display mode of the second type of target content may be referred to the display mode of the first type of target content. Details are not repeated herein.

When the at least two target resources included in the second type of target content are cyclically played, in response to determining that the second preset operation is received, the displays of the at least two target resources may be switched.

In one embodiment, when the user posts the multiple first type of target contents, the multiple first type of target contents share the same one audio resource and image enhancement effect while the viewing user client aggregately displays the first type of target contents posted within the set duration in the chronological order and supports automatic playing and manual switching playing, and the audio resource is played without interruption during the switching. The action numbers of the simultaneously posted multiple first type of target contents are independently counted, that is, the interaction information is independently counted.

When such operations as being shared and being collected on a sharing panel are performed for a separate first type of target content, the current first type of target content is presented to a shared user, but the shared user may still view, by sliding, other first type of target contents simultaneously posted with the first type of target content. When the separate first type of target content is shared, the operated separate first type of target content is decoupled from the remaining first type of target contents and uses the complete music, and the duration of the separate first type of target content follows the music duration or is default.

When viewing the second type of target content, the user may use the progress bar as an identifier of multiple pictures. When clicking on the position in which the text description information is located or the unfolding control, the user enters the detail interface. A picture is displayed on the top of the detail interface while the text description information, the comment information and the interaction control are displayed at the bottom of the detail interface.

Figure 15A:
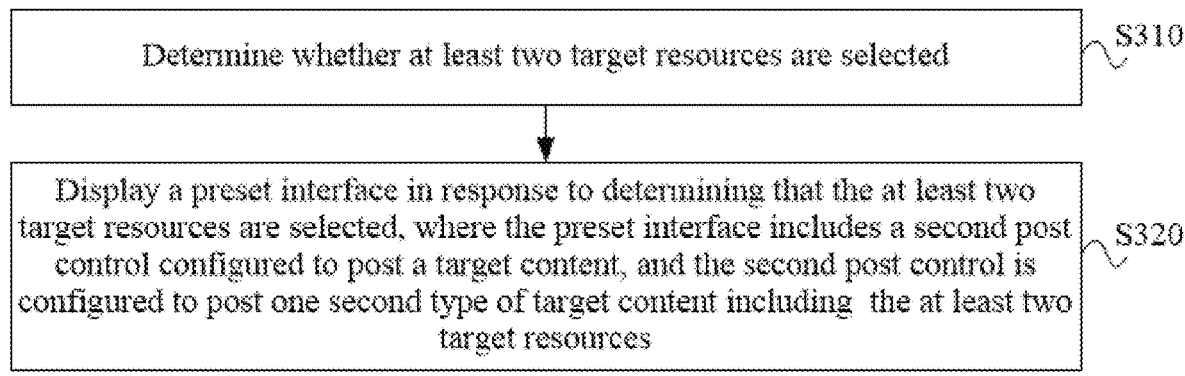
FIG. 15A is a flowchart of a content post method according to another embodiment of the present disclosure.

FIG. 15A is a flowchart of a content post method according to another embodiment of the present disclosure. The method is applicable to the case of content post. The method may be implemented by software and/or hardware and is integrated in an electronic device. The electronic device includes, but is not limited to, a mobile phone, a computer, or another device.

As shown in FIG. 15A, the method includes the steps below:

In S310, whether at least two target resources are selected, where the selected at least two target resources comprise at least one of an image or a video.

In S320, a preset interface is displayed in response to determining that the at least two target resources are selected, where the preset interface includes a second post control configured to post a target content, the second post control is configured to post one second type of target content including the at least two target resources, and the second type of target content is a resource set formed by aggregation of the at least two target resources.

For details not described in this embodiment, reference can be made to the preceding embodiments, and details are not described herein.

The preset interface disclosed in this embodiment only includes the second post control. The second type of target content can be more conveniently posted through the method according to this embodiment.

The present disclosure may further include a content post method. Whether at least two target resources are selected, where the selected at least two target resources comprise at least one of an image or a video; and a preset interface is displayed in response to determining that the at least two target resources are selected, where the preset interface includes a first post control configured to post a target content, and the first post control is configured to post each target resource of the at least two target resources as one second type of target content. The related content of the second type of target content in the method is referred to the preceding embodiments. Details are not repeated herein. In this solution, multiple works can be simultaneously posted, and thereby the convenience of content post can be improved.

Figure 15B:
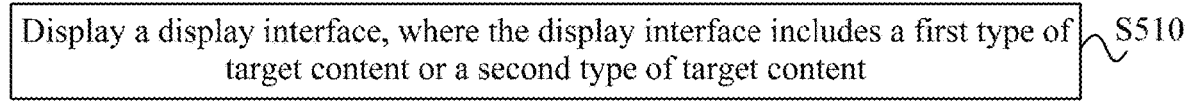
FIG. 15B is a flowchart of an information display method according to another embodiment of the present disclosure.

FIG. 15B is a flowchart of an information display method according to another embodiment of the present disclosure. The method is applicable to the case of information display. The method may be implemented by software and/or hardware and is integrated in an electronic device. The electronic device includes, but is not limited to, a mobile phone, a computer, or another device.

As shown in FIG. 15B, the information display method according to another embodiment of the present disclosure includes the steps below:

In S510, a display interface is displayed, where the display interface includes a first type of target content or a second type of target content.

For details not described about the first type of target content, the second type of target content and the display interface, reference can be made to the preceding embodiments, and details are not repeated herein. Target contents include the first type of target content and the second type of target content. In the information display method disclosed in this embodiment, the display interface may display the first type of target content or the second type of target content so that the target contents in different forms can be effectively displayed, and thereby convenience can be provided for the user to browse.

On the basis of the preceding embodiment, variant embodiments of the preceding embodiment are proposed. It is to be noted that herein, for the brevity of description, only differences from the preceding embodiment will be described in the variant embodiments.

In one embodiment, a first type of target content corresponding to each target resource is aggregately displayed on the display interface based on a preset condition, and/or interaction information of the first type of target content corresponding to the each target resource is independently recorded.

In one embodiment, the display interface aggregately displays the first type of target content within a set duration in a chronological order, and multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

In one embodiment, that the multiple first type of target contents are sequentially displayed on the display interface includes the steps below:

The display interface cyclically or sequentially plays the multiple first type of target contents, and/or after a first preset operation from the user is received, a first type of target content corresponding to the first preset operation is displayed.

In one embodiment, the multiple first type of target contents correspond to the same one audio resource, and when the multiple first type of target contents are played cyclically or sequentially, or are switched upon receiving the first preset operation, the audio resource continues to be played.

In one embodiment, when the multiple first type of target contents are sequentially displayed on the display interface, the method further includes the steps below.

After a sharing control on the display interface is triggered, when shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

In one embodiment, that at least two target resources included in the second type of target content are sequentially displayed on the display interface includes the steps below.

The display interface cyclically or sequentially plays multiple target sources, and/or after a second preset operation from the user is received, a target resource corresponding to the second preset operation is displayed.

In one embodiment, the display interface includes an interaction control, character information and/or a character information association control, and the method further includes the steps below:

A character information association interface is displayed in response to determining that a trigger operation for the character information and/or the character information association control is received, where the character information association interface includes the interaction control.

The interaction control may be considered as a control for the viewing user to perform interaction. The interaction object is not limited and may be determined based on the specific content of the interaction control. For example, when the interaction control fulfills the function of giving a like, the interaction object may be a creator user. When the interaction control fulfills the forwarding function, the interaction object may be a forwarded user.

The character information may be information existing in the form of characters on the display interface and may be used for describing the first type of target content or the second type of target content displayed on a display interfaces. The character information includes, but is not limited to, character description information. The character description information may be used for describing information of the first type of target content or the second type of target content.

The character information association control may be considered as a control associated with the character information. The character information association control is not limited herein, such as the unfolding control 41 shown in FIG. 10.

The trigger operation is not limited in the present disclosure and may be set according to a specific scenario or as required by business. Trigger operations include, but are not limited to, a click, a double click and a long press.

The character information association interface may be understood as an interface associated with the character information, such as a detail interface. The character information association interface may include all the character information and the content associated with the character information. The content associated with the character information is not limited and includes, but is not limited to, comment information corresponding to the character information.

Using FIG. 10 as an example, the character information in FIG. 10 is illustrated in the forms of "*" and "." (which is located before the unfolding control 41), and when the character information and/or the character information association control are triggered, the character information association interface is displayed and includes all the character information and the interaction control.

Figure 16:
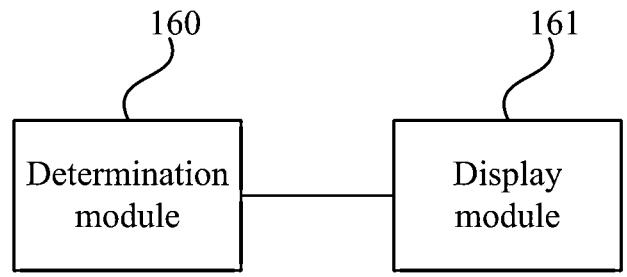
FIG. 16 is a diagram illustrating the structure of a content post apparatus according to an embodiment of the present disclosure.

FIG. 16 is a diagram illustrating the structure of a content post apparatus according to an embodiment of the present disclosure. The apparatus may be integrated in an electronic device. As shown in FIG. 16, the apparatus includes a determination module 160 and a display module 161.

The determination module 160 is configured to determine whether at least two target resources are selected, where the selected at least two target resources are each at least one of an image or a video.

The display module 161 is configured to display a preset interface in response to determining that the at least two target resources are selected, where the preset interface includes a second post control configured to post a target content, where the second post control is configured to post one second type of target content including the at least two target resources, and the second type of target content is a resource set formed by aggregation of the at least two target resources.

In this embodiment, the apparatus, through the determination module 160, first determines whether the at least two target resources are selected, where the selected at least two target resources comprise the at least one of the image or the video, and through the display module 161, displays the preset interface in response to determining that the at least two target resources are selected, where the preset interface includes the second post control configured to post the target content.

In the content post apparatus according to the present disclosure, the case where the current user's controllability of resources is poor can be avoided: the preset interface includes a first post control and the second post control so that the target contents corresponding to the at least two target resources can be posted in different forms; and the user can choose to distribute multiple target resources as multiple first type of target contents, for example, each target resource can be independently posted as one target content, or the user can choose to post the one second type of target content including the multiple target resources so that the user's controllability of the multiple target resources can be improved.

In one embodiment, the target resource is an image, and the preset interface further includes a first post control configured to post a target content, where the first post control is configured to post each target resource of the at least two target resources as one first type of target content. The first type of target content is a resource set or a video.

In one embodiment, the apparatus further includes a display module. The display module is configured to display a display interface, where the first type of target content corresponding to the each target resource is aggregately displayed on the display interface based on a preset condition, and/or interaction information of the first type of target content corresponding to the each target resource is independently recorded.

In one embodiment, the display interface aggregately displays the first type of target content within a set duration in a chronological order, and multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

In one embodiment, that the display module sequentially displays the multiple first type of target contents on the display interface includes the steps below.

The display interface cyclically or sequentially plays the multiple first type of target contents, and/or after a first preset operation from the user is received, a first type of target content corresponding to the first preset operation is displayed, and the multiple first type of target contents are cyclically played starting from the current first type of target content.

In one embodiment, the multiple first type of target contents correspond to the same one audio resource, and when the multiple first type of target contents are played cyclically or sequentially, or are switched upon receiving the first preset operation, the audio resource continues to be played.

In one embodiment, when the display module sequentially displays the multiple first type of target contents on the display interface, the method further includes the steps below.

After a sharing control on the display interface is triggered, when shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

In one embodiment, that the display module sequentially displays the at least two target resources included in the second type of target content on the display interface includes the steps below:

The display interface cyclically or sequentially plays multiple target sources, and/or after a second preset operation from the user is received, a target resource corresponding to the second preset operation is displayed, and the multiple target resources are cyclically played starting from the current target resource.

In one embodiment, the display module displays the at least two target resources in a third set position on the preset interface in a third set form, or one target resource of the at least two target resources is displayed in a fourth set position on the preset interface in a fourth set form.

In one embodiment, the third set form includes displaying thumbnails of the at least two target resources, and the fourth set form includes displaying the display order of the current target resource in the at least two target resources.

In one embodiment, the apparatus further includes a target resource display module. The target resource display module is configured to display a target resource corresponding to a set operation after the preset interface is displayed, and the set operation is received.

In one embodiment, the apparatus further includes an edit module. The edit module is configured to, after the target resource corresponding to the set operation is displayed, in response to determining that an edit operation for the currently displayed target resource is received, edit the currently displayed target resource based on the edit operation; and in response to determining that the edit operation for the currently displayed target resource is not received, cyclically play the multiple target resources starting from the currently displayed target resource.

The preceding content post apparatus may perform the a content post method according to any embodiment of the present disclosure and has function modules and beneficial effects corresponding to the performed method.

Figure 17:
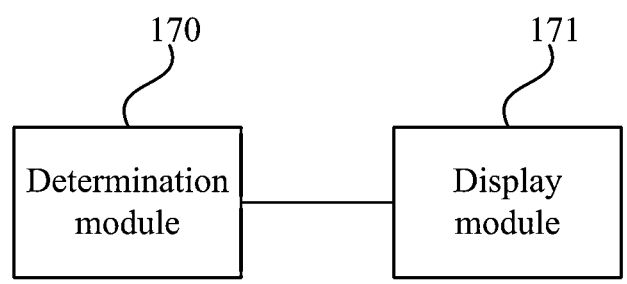
FIG. 17 is a diagram illustrating the structure of a content post apparatus according to another embodiment of the present disclosure.

FIG. 17 is a diagram illustrating the structure of a content post apparatus according to an embodiment of the present disclosure. The apparatus may be integrated in an electronic device. As shown in FIG. 17, the apparatus includes a determination module 170 and a display module 171.

The determination module 170 is configured to determine whether at least two target resources are selected, where the selected at least two target resources comprise at least one of an image or a video.

The display module 171 is configured to display a preset interface in response to determining that the at least two target resources are selected, where the preset interface includes a second post control configured to post a target content, the second post control is configured to post one second type of target content including the at least two target resources, and the second type of target content is a resource set formed by aggregation of the at least two target resources.

In this embodiment, the apparatus, through the determination module 170, first determines whether the at least two target resources are selected, where the selected at least two target resources are each the at least one of the image or the video, and through the display module 171, displays the preset interface in response to determining that the at least two target resources are selected, where the preset interface includes the second post control configured to post the target content, and the second post control is configured to post the one second type of target content including the at least two target resources.

The preceding content post apparatus may perform the content post method according to any embodiment of the present disclosure and has function modules and beneficial effects corresponding to the performed method.

Figure 18:
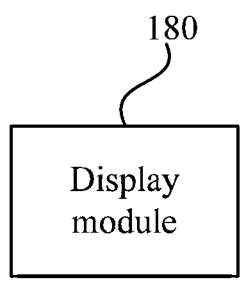
FIG. 18 is a diagram illustrating the structure of an information display apparatus according to an embodiment of the present disclosure.

FIG. 18 is a diagram illustrating the structure of an information display apparatus according to another embodiment of the present disclosure. The apparatus is integrated in an electronic device. As shown in FIG. 18, the apparatus includes a display module 180. The display module 180 is configured to display a display interface, where the display interface includes the first type of target content or the second type of target content according to the embodiment of the present disclosure.

The preceding information display apparatus may perform the information display method according to the embodiment of the present disclosure and has function modules and beneficial effects corresponding to the performed method.

In one embodiment, a first type of target content corresponding to each target resource is aggregately displayed on the display interface based on a preset condition, and/or interaction information of the first type of target content corresponding to the each target resource is independently recorded.

In one embodiment, the display interface aggregately displays the first type of target content within a set duration in a chronological order, and multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

In one embodiment, that the multiple first type of target contents are sequentially displayed on the display interface includes the steps below.

The display interface cyclically or sequentially plays the multiple first type of target contents, and/or after a first preset operation from the user is received, a first type of target content corresponding to the first preset operation is displayed.

In one embodiment, the multiple first type of target contents correspond to the same one audio resource, and when the multiple first type of target contents are played cyclically or sequentially, or are switched upon receiving the first preset operation, the audio resource continues to be played.

In one embodiment, when the multiple first type of target contents are sequentially displayed on the display interface, the method further includes the steps below.

After a sharing control on the display interface is triggered, when shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

In one embodiment, that at least two target resources included in the second type of target content are sequentially displayed on the display interface includes the steps below:

The display interface cyclically or sequentially plays multiple target sources, and/or after a second preset operation from the user is received, a target resource corresponding to the second preset operation is displayed.

In one embodiment, the display interface includes an interaction control, character information and/or a character information association control, and the apparatus further includes a receiving module.

The receiving module is configured to display a character information association interface in response to triggering for the character information and/or the character information association control, where the character information association interface includes the interaction control.

Figure 19:
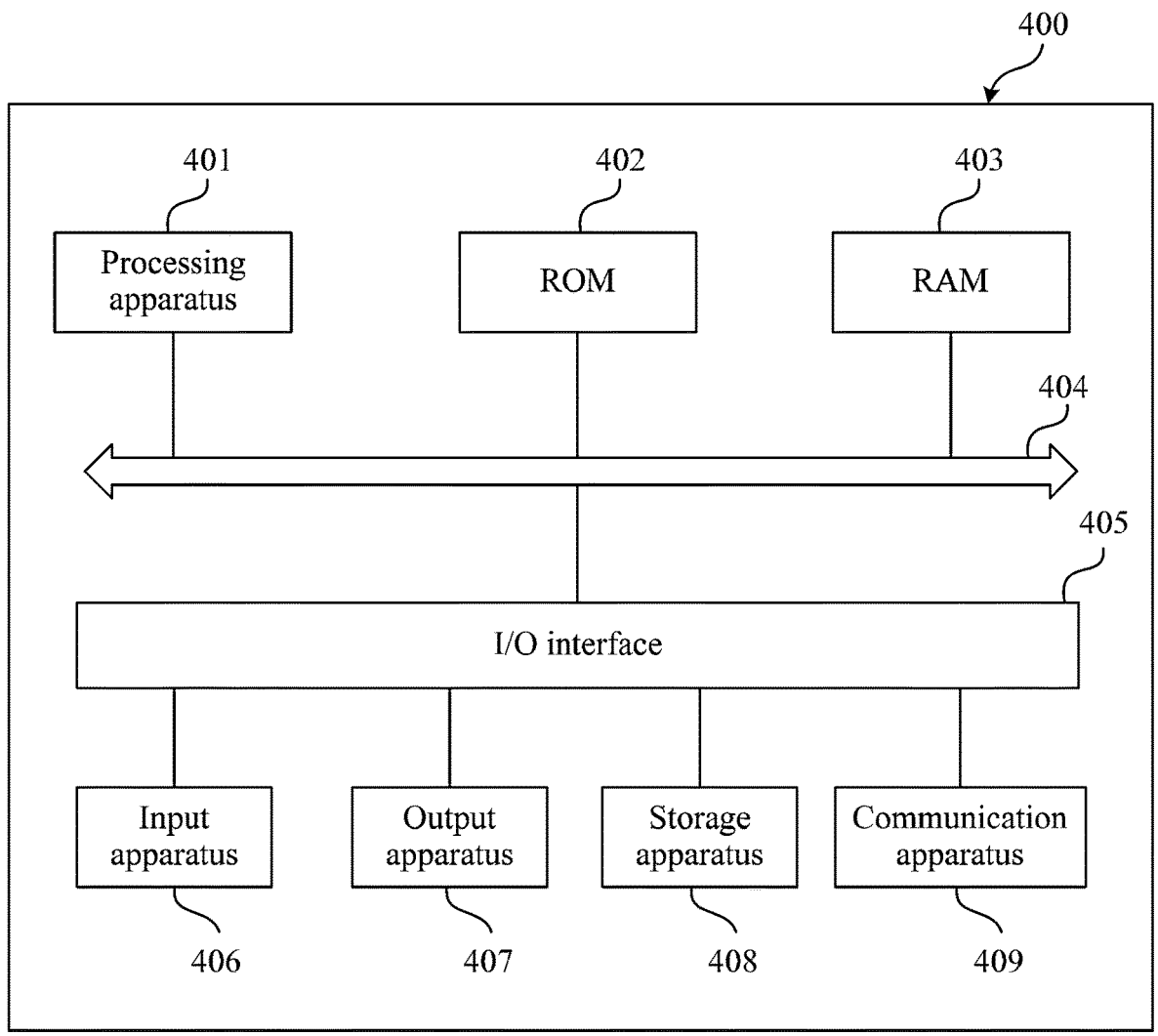
FIG. 19 is a diagram illustrating the structure of an electronic device according to an embodiment of the present disclosure.

FIG. 19 is a diagram illustrating the structure of an electronic device according to an embodiment of the present disclosure. FIG. 19 is a diagram illustrating the structure of an electronic device 400 applicable to implementing an embodiment of the present disclosure. The electronic device 400 in the embodiment of the present disclosure may include, but is not limited to, a mobile terminal such as a mobile phone, a laptop, a digital broadcast receiver, a personal digital assistant (PDA), a portable Android device (PAD), a portable media player (PMP), or a vehicle-mounted terminal (such as a vehicle-mounted navigation terminal), or a fixed terminal such as a digital television (TV) or a desktop computer. The electronic device 400 shown in FIG. 19 is merely an example and is not intended to limit the function and use scope of embodiments of the present disclosure.

As shown in FIG. 19, the electronic device 400 may include one or more processing apparatuses (such as a central processing unit and a graphics processing unit) 401. The one or more processing apparatuses 401 may execute various appropriate actions and processing according to a program stored in a read-only memory (ROM) 402 or a program loaded into a random access memory (RAM) 403 from a storage apparatus 408. The one or more processing apparatuses 401 perform the content post method according to the present disclosure. Various programs and data required for the operation of the electronic device 400 are also stored in the RAM 403. The one or more processing apparatuses 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer, or a gyroscope; an output apparatus 407 such as a liquid crystal display (LCD), a speaker, or a vibrator; the storage apparatus 408, such as a magnetic tape or a hard disk, that is used for storing one or more programs; and a communication apparatus 409. The communication apparatus 409 may allow the electronic device 400 to perform wireless or wired communication with another device to exchange data. Although FIG. 19 illustrates the electronic device 400 having various apparatuses, it is to be understood that not all of the illustrated apparatuses are implemented or available. Alternatively, more or fewer apparatuses may be implemented.

According to the embodiments of the present disclosure, the processes described in the preceding with reference to the flowcharts may be implemented as computer software programs. For example, this embodiment of the present disclosure includes a computer program product. The computer program product includes a computer program carried in a computer-readable medium. The computer program includes program codes for performing the method shown in the flowcharts. In such an embodiment, the computer program may be downloaded from a network and installed through the communication apparatus 409, or may be installed from the storage apparatus 408, or may be installed from the ROM 402. When the computer program is executed by the processing apparatus 401, the preceding functions defined in the methods according to the embodiments of the present disclosure are performed.

It is to be noted that the preceding computer-readable medium in the present disclosure may be a computer-readable signal medium or a computer-readable storage medium, or any combination thereof. The computer-readable storage medium may be, but is not limited to, an electrical, magnetic, optical, electromagnetic, infrared or semiconductor system, apparatus or device, or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. The program codes included on the computer-readable medium may be transmitted via any appropriate medium including, but not limited to, an electrical wire, an optical cable, a radio frequency (RF), or any appropriate combination thereof.

In some embodiments, clients and servers may communicate using any currently known or future developed network protocol, such as the Hypertext Transfer Protocol (HTTP), and may be interconnected with any form or medium of digital data communication (such as a communication network). Examples of the communication network include a local area network (LAN), a wide area network (WAN), an internet (such as the Internet), and a peer-to-peer network (such as an Ad-Hoc network), as well as any currently known or future developed network.

The preceding computer-readable medium may be included in the electronic device 400 or may exist alone without being assembled into the electronic device 400.

The preceding computer-readable medium stores one or more computer programs. When executed by a processing apparatus, the one or more computer programs cause the processing apparatus to perform the method below.

Whether at least two target resources are selected, where the selected at least two target resources comprise at least one of an image or a video.

A preset interface is displayed in response to determining that the at least two target resources are selected, where the preset interface includes a second post control configured to post a target content, the second post control is configured to post one second type of target content including the at least two target resources, and the second type of target content is a resource set formed by aggregation of the at least two target resources.

The preceding computer-readable medium stores one or more computer programs. When executed by a processing apparatus, the one or more computer programs cause the processing apparatus to perform the method below:

Whether at least two target resources are selected, where the selected at least two target resources comprise at least one of an image or a video.

A preset interface is displayed in response to determining that the at least two target resources are selected, where the preset interface includes a second post control configured to post a target content, the second post control is configured to post one second type of target content including the at least two target resources, and the second type of target content is a resource set formed by aggregation of the at least two target resources.

The preceding computer-readable medium carries one or more programs. When executed by the electronic device, the preceding one or more programs cause the electronic device 400 to write computer program codes for performing the operations of the present disclosure in one or more programming languages or combination thereof. The preceding one or more programming languages include object-oriented programming languages such as Java, Smalltalk and C++, as well as conventional procedural programming languages such as "C" or similar programming languages. The program codes may be executed entirely on a user computer, executed partly on a user computer, executed as a standalone software package, executed partly on a user computer and partly on a remote computer, or executed entirely on a remote computer or a server. In the case where a remote computer is involved, the remote computer may be connected to a user computer via any type of network including a local area network (LAN) or a wide area network (WAN) or may be connected to an external computer (for example, via the Internet provided by an Internet service provider).

The flowcharts and block diagrams in the drawings illustrate possible architectures, functions and operations of the system, method and computer program product according to the embodiments of the present disclosure. Each block in the flowcharts or block diagrams may represent a module, a program segment or part of codes that contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The described modules involved in the embodiments of the present disclosure may be implemented by software or hardware. The name of a module is not intended to limit the module in a certain circumstance.

The functions described herein may be performed, at least partially, by one or more hardware logic components. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD) and the like.

In the context of the present disclosure, a machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof.

According to one or more embodiments of the present disclosure, example 1 provides a content post method. The method includes the steps below.

Whether at least two target resources are selected, where the selected at least two target resources comprise at least one of an image or a video.

A preset interface is displayed in response to determining that the at least two target resources are selected, where the preset interface includes a second post control configured to post a target content, where the second post control is configured to post one second type of target content including the at least two target resources, and the second type of target content is a resource set formed by aggregation of the at least two target resources.

According to one or more embodiments of the present disclosure, in example 2 based on example 1, the at least two target resources are each an image, and the preset interface further includes a first post control configured to post a target content, where the first post control is configured to post each target resource of the at least two target resources as one first type of target content. The first type of target content is a resource set or a video.

According to one or more embodiments of the present disclosure, in example 3 based on example 1, the method further includes the steps below:

A display interface is displayed, where the first type of target content corresponding to the each target resource is aggregately displayed on the display interface based on a preset condition, and/or interaction information of the first type of target content corresponding to the each target resource is independently recorded.

According to one or more embodiments of the present disclosure, in example 4 based on example 1, the display interface aggregately displays the first type of target content within a set duration in a chronological order, and multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

According to one or more embodiments of the present disclosure, in example 5 based on example 4, that the multiple first type of target contents are sequentially displayed on the display interface includes the steps below:

The display interface cyclically or sequentially plays the multiple first type of target contents, and/or after a first preset operation from the user is received, a first type of target content corresponding to the first preset operation is displayed, and the multiple first type of target contents are cyclically played starting from the current first type of target content.

According to one or more embodiments of the present disclosure, in example 6 based on example 5, the multiple first type of target contents correspond to the same one audio resource, and when the multiple first type of target contents are played cyclically or sequentially, or are switched upon receiving the first preset operation, the audio resource continues to be played.

According to one or more embodiments of the present disclosure, in example 7 based on example 4, when the multiple first type of target contents are sequentially displayed on the display interface, the method further includes the steps below.

After a sharing control on the display interface is triggered, when shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

According to one or more embodiments of the present disclosure, in example 8 based on example 4, that the at least two target resources included in the second type of target content are sequentially displayed on the display interface includes the steps below.

The display interface cyclically or sequentially plays multiple target sources, and/or after a second preset operation from the user is received, a target resource corresponding to the second preset operation is displayed, and the multiple target resources are cyclically played starting from the current target resource.

According to one or more embodiments of the present disclosure, in example 9 based on example 1, the at least two target resources are displayed in a third set position on the preset interface in a third set form, or one target resource of the at least two target resources is displayed in a fourth set position on the preset interface in a fourth set form.

According to one or more embodiments of the present disclosure, in example 10 based on example 9, the third set form includes displaying thumbnails of the at least two target resources, and the fourth set form includes displaying the display order of the current target resource in the at least two target resources.

According to one or more embodiments of the present disclosure, in example 11 based on example 1, after the preset interface is displayed, the method further includes the steps below.

After a set operation is received, a target resource corresponding to the set operation is displayed.

According to one or more embodiments of the present disclosure, in example 12 based on example 11, after the target resource corresponding to the set operation is displayed, the method further includes the steps below.

In response to determining that an edit operation for the currently displayed target resource is received, the currently displayed target resource is edited based on the edit operation; and in response to determining that the edit operation for the currently displayed target resource is not received, the multiple target resources are cyclically played starting from the currently displayed target resource.

According to one or more embodiments of the present disclosure, example 13 provides a content post method. The method includes the steps below.

Whether at least two target resources are selected, where selected the at least two target resources comprise at least one of an image or a video.

A preset interface is displayed in response to determining that the at least two target resources are selected, where the preset interface includes a second posting control configured to post a target content, the second post control is configured to post one second type of target content comprising the at least two target resources, and the second type of target content is a resource set formed by aggregation of the at least two target resources.

According to one or more embodiments of the present disclosure, example 14 provides a content post apparatus. The apparatus includes a determination module and a display module.

The determination module is configured to determine whether at least two target resources are selected, where the selected at least two target resources comprises at least one of an image or a video.

The display module is configured to display a preset interface in response to determining that the at least two target resources are selected, where the preset interface includes a second post control configured to post a target content, where the second post control is configured to post one second type of target content comprising the at least two target resources, and the second type of target content is a resource set formed by aggregation of the at least two target resources.

According to one or more embodiments of the present disclosure, example 15 provides a content post apparatus. The apparatus includes a determination module and a display module.

The determination module is configured to determine whether at least two target resources are selected, where the selected at least two target resources comprise at least one of an image or a video.

The display module is configured to display a preset interface in response to determining that the at least two target resources are selected, where the preset interface includes a second post control configured to post a target content, the second post control is configured to post one second type of target content comprising the at least two target resources, and the second type of target content is a resource set formed by aggregation of the at least two target resources.

According to one or more embodiments of the present disclosure, example 16 provides an electronic device. The electronic device includes one or more processing apparatuses, and a storage apparatus configured to store one or more programs. When executed by the one or more processing apparatuses, the one or more programs cause the one or more processing apparatuses to perform the method according to any one of examples 1 to 13.

According to one or more embodiments of the present disclosure, example 17 provides a computer-readable medium storing a computer program which, when executed by a processing apparatus, causes the processing apparatus to perform the method according to any one of examples 1 to 13.

According to one or more embodiments of the present disclosure, example 1 provides a content post method. The method includes the steps below.

Whether at least two target resources are selected, where the at least two target resources comprise at least one of an image or a video.

A preset interface is displayed in response to determining that the at least two target resources are selected, where the preset interface includes a second post control configured to post a target content, where the second post control is configured to post one second type of target content comprising the at least two target resources, and the second type of target content is a resource set formed by aggregation of the at least two target resources.

According to one or more embodiments of the present disclosure, in example 2 based on example 1, the at least two target resources are each an image, and the preset interface further includes a first post control configured to post a target content, where the first post control is configured to post each target resource of the at least two target resources as one first type of target content. The first type of target content is a resource set or a video.

According to one or more embodiments of the present disclosure, in example 3 based on example 1, the method further includes the steps below.

A display interface is displayed, where the first type of target content corresponding to the each target resource is aggregately displayed on the display interface based on a preset condition, and/or interaction information of the first type of target content corresponding to the each target resource is independently recorded.

According to one or more embodiments of the present disclosure, in example 4 based on example 1, the at least two target resources are displayed in a third set position on the preset interface in a third set form, or one target resource of the at least two target resources is displayed in a fourth set position on the preset interface in a fourth set form.

According to one or more embodiments of the present disclosure, in example 5 based on example 4, the third set form includes displaying thumbnails of the at least two target resources, and the fourth set form includes displaying the display order of the current target resource in the at least two target resources.

According to one or more embodiments of the present disclosure, in example 6 based on example 1, after the preset interface is displayed, the method further includes the step below.

After a set operation is received, a target resource corresponding to the set operation is displayed.

According to one or more embodiments of the present disclosure, in example 7 based on example 6, after the target resource corresponding to the set operation is displayed, the method further includes the steps below.

In response to determining that an edit operation for the currently displayed target resource is received, the currently displayed target resource is edited based on the edit operation; and in response to determining that the edit operation for the currently displayed target resource is not received, multiple target resources are cyclically played starting from the currently displayed target resource.

According to one or more embodiments of the present disclosure, example 8 provides an information display method. The method includes the steps below.

A display interface is displayed, where the display interface includes the second type of target content according to example 1 or the first type of target content according to example 2.

According to one or more embodiments of the present disclosure, in example 9 based on example 8.

A first type of target content corresponding to each target resource is aggregately displayed on the display interface based on a preset condition, and/or interaction information of the first type of target content corresponding to the each target resource is independently recorded.

According to one or more embodiments of the present disclosure, in example 10 based on example 9.

The display interface aggregately displays the first type of target content within a set duration in a chronological order, and multiple first type of target contents are sequentially displayed on the display interface or simultaneously displayed in a first set position on the display interface in a first set form: or at least two target resources included in the second type of target content are sequentially displayed on the display interface or simultaneously displayed in a second set position on the display interface in a second set form.

According to one or more embodiments of the present disclosure, in example 11 based on example 10, that the multiple first type of target contents are sequentially displayed on the display interface includes the steps below.

The display interface cyclically or sequentially plays the multiple first type of target contents, and/or after a first preset operation from the user is received, a first type of target content corresponding to the first preset operation is displayed.

According to one or more embodiments of the present disclosure, in example 12 based on example 11, the multiple first type of target contents correspond to the same one audio resource, and when the multiple first type of target contents are played cyclically or sequentially, or are switched upon receiving the first preset operation, the audio resource continues to be played.

According to one or more embodiments of the present disclosure, in example 13 based on example 10, when the multiple first type of target contents are sequentially displayed on the display interface, the method further includes the steps below.

After a sharing control on the display interface is triggered, when shared first type of target contents are displayed, other first type of target contents aggregately displayed or simultaneously posted are played starting from the currently shared first type of target content, or when the shared first type of target contents are displayed, in response to determining that the first preset operation from the user is received, a first type of target content corresponding to the first preset operation is displayed.

According to one or more embodiments of the present disclosure, in example 14 based on example 10, that the at least two target resources included in the second type of target content are sequentially displayed on the display interface includes the steps below:

The display interface cyclically or sequentially plays multiple target sources, and/or after a second preset operation from the user is received, a target resource corresponding to the second preset operation is displayed.

According to one or more embodiments of the present disclosure, in example 15 based on example 8, the display interface includes an interaction control, character information and/or a character information association control, and the method further includes the steps below.

A character information association interface is displayed in response to determining that a trigger operation for the character information and/or the character information association control is received, where the character information association interface includes the interaction control.

According to one or more embodiments of the present disclosure, example 16 provides a content post apparatus. The apparatus includes a determination module and a display module.

The determination module is configured to determine whether at least two target resources are selected, where the at least two target resources comprises at least one of an image or a video.

The display module is configured to display a preset interface in response to determining that the at least two target resources are selected, where the preset interface includes a second post control configured to post a target content, where the second post control is configured to post one second type of target content comprising the at least two target resources, and the second type of target content is a resource set formed by aggregation of the at least two target resources.

According to one or more embodiments of the present disclosure, example 17 provides an information display apparatus. The apparatus includes a display module.

The display module is configured to display a display interface, where the display interface includes the second type of target content according to example 1 or the first type of target content according to example 2.

According to one or more embodiments of the present disclosure, example 18 provides an electronic device. The electronic device includes one or more processing apparatuses, and a storage apparatus configured to store one or more programs. When executed by the one or more processing apparatuses, the one or more programs cause the one or more processing apparatuses to perform the method according to any one of examples 1 to 15.

According to one or more embodiments of the present disclosure, example 19 provides a computer-readable medium storing a computer program which, when executed by a processing apparatus, causes the processing apparatus to perform the method according to any one of examples 1 to 15.

The preceding description is merely illustrative of example embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combination of the preceding technical features or their equivalents without departing from the concept of the present disclosure, for example, technical solutions formed by the substitutions of the preceding features with the technical features (not limited to being) disclosed in the present disclosure and having similar functions.

Additionally, although operations are illustrated in a particular order, it should not be construed as that the operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Rather, features described in the context of a single embodiment may also be implemented in multiple embodiments separately or in any appropriate sub-combination.

What is claimed is:

1. An information posting method, comprising:
    determining whether at least two resources are selected, wherein the selected at least two resources comprise at least one of an image or a video; and
    displaying a preset interface in response to determining that the at least two resources are selected, wherein the preset interface comprises a first post control and a second post control which are configured to post a content, wherein the first post control is configured to post each resource of the at least two resources as a first type of content, the first type of content is an independent work, and the at least two resources are posted as at least two independent works, the second post control is configured to post a second type of content comprising the at least two resources and the second type of content is a resource set formed by aggregation of the at least two resources, and the second type of content is an independent work;
    wherein the first type of content or the second type of content is displayed with at least one of an interaction control or character information upon an image displaying region, wherein the character information is information displaying in a form of characters on a display interface;
    wherein each independent work has its own interaction control.

2. The method according to claim 1, wherein the first type of content is a resource set or a video and the second type of content is a resource set or a video.

3. The method according to claim 1, further comprising: displaying the display interface and at least one of:
    displaying the first type of content corresponding to the each resource on the display interface based on a preset condition; or
    independently recording interaction information of the first type of content corresponding to the each resource.

4. The method according to claim 1, wherein the at least two resources are displayed in a third set position on the preset interface in a third set form; or
    one resource of the at least two resources is displayed in a fourth set position on the preset interface in a fourth set form.

5. The method according to claim 4, wherein the third set form comprises displaying thumbnails of the at least two resources; and
    the fourth set form comprises displaying a display order of a current resource in the at least two resources.

6. The method according to claim 1, wherein after displaying the preset interface, the method further comprises:
    after a set operation is received, displaying a resource corresponding to the set operation.

7. The method according to claim 6, wherein after displaying the resource corresponding to the set operation, the method further comprises:
    in response to determining that an edit operation for a currently displayed resource is received, editing the currently displayed resource based on the edit operation; and in response to determining that the edit operation for the currently displayed resource is not received, cyclically playing a plurality of resources starting from the currently displayed resource.

8. An apparatus, comprising:
    at least one processor; and
    a storage apparatus, configured to store at least one program;
    wherein the at least one program, when executed by the at least one processor, cause the processor to perform to perform operations comprising:
    determining whether at least two resources are selected, wherein the selected at least two resources comprise at least one of an image or a video; and
    displaying a preset interface in response to determining that the at least two resources are selected, wherein the preset interface comprises a first post control and a second post control which are configured to post a content, wherein the first post control is configured to post each resource of the at least two resources as a first type of content, the first type of content is an independent work, and the at least two resources are posted as at least two independent works, the second post control is configured to post a second type of content comprising the at least two resources and the second type of content is a resource set formed by aggregation of the at least two resources, and the second type of content is an independent work;
    wherein the first type of content or the second type of content is displayed with at least one of an interaction control or character information upon an image displaying region, wherein the character information is information displaying in a form of characters on a display interface;
    wherein each independent work has its own interaction control.

9. The apparatus according to claim 8, wherein the first type of content is a resource set or a video and the second type of content is a resource set or a video.

10. The apparatus according to claim 8, wherein the operations further comprise: displaying the display interface and at least one of:
  displaying the first type of content corresponding to the each resource on the display interface based on a preset condition; or
  independently recording interaction information of the first type of content corresponding to the each resource.

11. The apparatus according to claim 8, wherein the at least two resources are displayed in a third set position on the preset interface in a third set form; or
  one resource of the at least two resources is displayed in a fourth set position on the preset interface in a fourth set form.

12. The apparatus according to claim 11, wherein the third set form comprises displaying thumbnails of the at least two resources; and
  the fourth set form comprises displaying a display order of a current resource in the at least two resources.

13. The apparatus according to claim 8, wherein after displaying the preset interface, the operations further comprise:
  after a set operation is received, displaying a resource corresponding to the set operation.

14. The apparatus according to claim 13, wherein after displaying the resource corresponding to the set operation, the operations further comprise:
  in response to determining that an edit operation for a currently displayed resource is received, editing the currently displayed resource based on the edit operation; and in response to determining that the edit operation for the currently displayed resource is not received, cyclically playing a plurality of resources starting from the currently displayed resource.

15. A non-transitory computer-readable medium storing a computer program which, when executed by a processing apparatus, causes the processing apparatus to perform operations comprising:
  determining whether at least two resources are selected, wherein the selected at least two resources comprise at least one of an image or a video; and
  displaying a preset interface in response to determining that the at least two resources are selected, wherein the preset interface comprises a first post control and a second post control which are configured to post a content, wherein the first post control is configured to post each resource of the at least two resources as a first type of content, the first type of content is an independent work, and the at least two resources are posted as at least two independent works, the second post control is configured to post a second type of content comprising the at least two resources and the second type of content is a resource set formed by aggregation of the at least two resources, and the second type of content is an independent work;
  wherein the first type of content or the second type of content is displayed with at least one of an interaction control or character information upon an image displaying region, wherein the character information is information displaying in a form of characters on a display interface;
  wherein each independent work has its own interaction control.

16. The non-transitory computer-readable medium according to claim 15, wherein the first type of content is a resource set or a video and the second type of content is a resource set or a video.

17. The non-transitory computer-readable medium according to claim 15, wherein the operations further comprise: displaying the display interface and at least one of:
  displaying the first type of content corresponding to the each resource on the display interface based on a preset condition; or
  independently recording interaction information of the first type of content corresponding to the each resource.

18. The non-transitory computer-readable medium according to claim 15, wherein the at least two resources are displayed in a third set position on the preset interface in a third set form; or
  one resource of the at least two resources is displayed in a fourth set position on the preset interface in a fourth set form.

19. The non-transitory computer-readable medium according to claim 18, wherein the third set form comprises displaying thumbnails of the at least two resources; and
  the fourth set form comprises displaying a display order of a current resource in the at least two resources.

20. The non-transitory computer-readable medium according to claim 15, wherein after displaying the preset interface, the operations further comprise:
  after a set operation is received, displaying a resource corresponding to the set operation.

21. The non-transitory computer-readable medium according to claim 20, wherein after displaying the resource corresponding to the set operation, the operations further comprise:
  in response to determining that an edit operation for a currently displayed resource is received, editing the currently displayed resource based on the edit operation; and in response to determining that the edit operation for the currently displayed resource is not received, cyclically playing a plurality of resources starting from the currently displayed resource.

* * * * *